United States Patent
Al-Dujaili et al.

(10) Patent No.: US 11,733,051 B2
(45) Date of Patent: Aug. 22, 2023

(54) COMMUNICATIONS SERVER APPARATUS, METHOD AND COMMUNICATIONS SYSTEM FOR MANAGING REQUEST FOR TRANSPORT-RELATED SERVICES

(71) Applicant: GRABTAXI HOLDINGS PTE., LTD., Oue Downtown (SG)

(72) Inventors: Abdullah Shamil Hashim Al-Dujaili, Cambridge, MA (US); Hendra Teja Wirawan, Singapore (SG); Wenqing Chen, Singapore (SG); Su Miin Serene Ow, Singapore (SG); Zhen Xiang Kenneth Loh, Singapore (SG); Guanfeng Wang, Singapore (SG); Chin Hau Hoo, Singapore (SG); Dmitry Bezyazychnyy, Singapore (SG); Yonghao Chen, Singapore (SG); Abhinav Sunderrajan, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 139 days.

(21) Appl. No.: 17/294,457

(22) PCT Filed: Nov. 19, 2018

(86) PCT No.: PCT/SG2018/050573
§ 371 (c)(1),
(2) Date: May 17, 2021

(87) PCT Pub. No.: WO2020/106211
PCT Pub. Date: May 28, 2020

(65) Prior Publication Data
US 2022/0018667 A1 Jan. 20, 2022

(51) Int. Cl.
G01C 21/34 (2006.01)

(52) U.S. Cl.
CPC ..... *G01C 21/3423* (2013.01); *G01C 21/3453* (2013.01)

(58) Field of Classification Search
CPC ............ G01C 21/3423; G01C 21/3438; G01C 21/3453; G01C 21/3461; G01C 21/3484;
(Continued)

(56) References Cited

U.S. PATENT DOCUMENTS

| 8,731,814 B2 | 5/2014 | Schunder |
| 10,082,793 B1 | 9/2018 | Glaser |

(Continued)

FOREIGN PATENT DOCUMENTS

| CN | 102374862 | 3/2012 |
| CN | 107944611 | 4/2018 |

(Continued)

OTHER PUBLICATIONS

International Search Report for Application No. PCT/SG2018/050573, dated Feb. 21, 2019.
(Continued)

*Primary Examiner* — Spencer D Patton
(74) *Attorney, Agent, or Firm* — Buckley, Maschoff & Talwalker LLC

(57) ABSTRACT

A communications server apparatus for managing a request for transport-related services, which is configured to, in response to receiving user request data, generate a data record having a plurality of transit point data fields having data for a corresponding plurality of transit points from an origin to a destination, including a variable transit point data field having data that is determined based on data associated with at least one transportation network-related parameter, and having a plurality of trip section data fields for a corresponding plurality of trip sections defining navigation directions from the origin to the destination, and, for each
(Continued)

trip section data field, to associate the trip section data field with a respective transit point data field, and, based on the data of the associated transit point data field, to determine a respective transportation mode and to generate transit data in respect of the respective transportation mode.

18 Claims, 12 Drawing Sheets

(58) Field of Classification Search
CPC ............ G01C 21/3492; G06Q 10/025; G06Q 10/047; G08G 1/005
See application file for complete search history.

(56) References Cited

U.S. PATENT DOCUMENTS

| | | | |
|---|---|---|---|
| 2012/0004841 | A1 | 1/2012 | Schunder |
| 2013/0073327 | A1 | 3/2013 | Edelberg |
| 2018/0005145 | A1 | 1/2018 | Lo |
| 2018/0156623 | A1* | 6/2018 | West .................. G01C 21/3484 |
| 2018/0245933 | A1 | 8/2018 | Scofield et al. |
| 2018/0349809 | A1 | 12/2018 | Herminghaus et al. |
| 2019/0063935 | A1* | 2/2019 | Badalamenti ...... G01C 21/3438 |

FOREIGN PATENT DOCUMENTS

| | | |
|---|---|---|
| CN | 109074534 | 12/2018 |
| DE | 102011077942 | 1/2012 |
| EP | 3203421 | 8/2017 |
| EP | 3411838 | 12/2018 |
| JP | 2002-114149 | 4/2002 |
| JP | 2022-114149 | 4/2002 |
| JP | 2012-215921 | 11/2012 |
| JP | 2015-94704 | 5/2015 |
| JP | 2018-96810 | 6/2018 |
| RU | 2011126993 | 1/2013 |
| WO | WO-2013-043613 | 3/2013 |
| WO | WO-2017-134299 | 8/2017 |
| WO | WO-2018/163157 | 9/2018 |
| WO | WO-2018-163157 | 9/2018 |

OTHER PUBLICATIONS

Written Opinion for Application No. PCT/SG2018/050573, dated Oct. 29, 2020.
Written Opinion for Application No. 11202104839T, dated Aug. 10, 2021, (7 pages).
Singapore Written Opinion for Application No. 11202104839T, dated Aug. 11, 2021, 7 pages.
European Search Report for Application No. 18940602.8, dated Oct. 13, 2021 (9 pages).
Japanese Notice of Refusal for Application No. 2021-527935, dated Dec. 27, 2022 (14 pages).
Japanese Office Action for Application No. 2021-527935, dated Dec. 27, 2022, (14 pages).

* cited by examiner

| Name | Type | Purpose |
|---|---|---|
| Road Network | Directed Graph | graph where nodes are streets (or intersections) and edges are intersections (or streets) connecting the nodes. |
| Transit Network | Directed Graph | graph where nodes are designated stops and edges are connections. |
| Multi-Modal Network | Directed Multi-Edge Graph | graph to encode possible multi-modal itineraries from O to D |
| Real-Time Connections | Data Stream | a stream of connections between designated transit stops sorted by their departure times. |
| Historical Trips | Database | For metric forecasting and transit points ranking. |
| Itinerary Comparator | Priority Queue | To sort multi-modal itineraries with respect to a specific criterion. |
| Non-Dominated Archive | Pareto Approximation Set | To maintain the set of optimal multi-modal itineraries based on the Multi-Modal Network |

FIG. 9

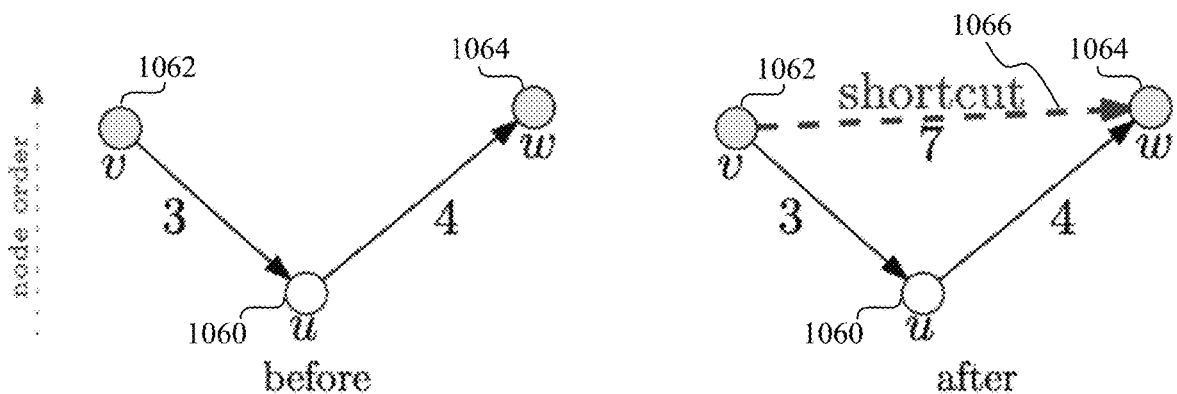

FIG. 10A

COMMUNICATIONS SERVER APPARATUS, METHOD AND COMMUNICATIONS SYSTEM FOR MANAGING REQUEST FOR TRANSPORT-RELATED SERVICES

TECHNICAL FIELD

The invention relates generally to the field of communication and journey planning. One aspect of the invention relates to a communications server apparatus for managing a request for transport-related services. Another aspect of the invention relates to a method for managing a request for transport-related services. Further aspects relate to a computer program product, a computer program, a non-transitory storage medium having instructions for implementing the method, and a communications system for managing a request for transport-related services.

One aspect of the invention has particular, but not exclusive, application to handling requests, for example, transport-related service requests relating to a journey from an origin location (O) to a destination location (D). This may include, responsive to a request from a user, providing journey options from O to D, including multi-modal journey options, for selection by the user. Pareto-optimised journey options may be identified for the user.

BACKGROUND

A transportation system is generally faced with the first/last-mile problem, where users may face challenges getting from their origins onto the transportation network, and/or getting from the transportation network to their destinations. Known systems try to solve the first/last-mile problem by stitching an on-demand leg to a fixed leg or vice-versa. Informally, this may be known as Park and Ride.

SUMMARY

Aspects of the invention are as set out in the independent claims. Some optional features are defined in the dependent claims.

Implementation of the techniques disclosed herein may provide one or more significant technical advantages. This includes the generation of a network having a variable transit point that is determined based on at least one transportation network-related parameter. The variable transit point may not be constrained by fixed or schedule-based transportation services nor be rigidly assigned to a fixed position, but whose location may suitably be determined taking into consideration one or more parameters of the transportation network to maximise any desirable effect(s) and minimise any undesirable effect(s) or risk(s) relating to the parameter(s).

In at least some implementations, the techniques disclosed herein may provide for identification of pareto-optimised journey options that are optimised against a number of parameters. The techniques may also provide for the variable transit point to be associated with a ride-hailing transportation mode, where the variable transit point may be determined based on at least one of supply of drivers, accessibility, risk of fare surging or minimal detour.

BRIEF DESCRIPTION OF THE DRAWINGS

The invention will now be described, by way of example only, and with reference to the accompanying drawings in which:

FIG. 9 shows exemplary data structures and their purposes.

FIG. 10A illustrates an approach of contracting a node.

DETAILED DESCRIPTION

A multi-modal trip recommender system may be provided, for example, a system to generate and identify competitive multi-modal itineraries.

A system is provided for getting a user or anyone from an origin (O) to a destination (D) that may be tailored to their preferences and situation at any moment in time, and that may be in the most optimised way. The system leverages on on-demand and/or ride-hailing transport options and the public transport (or any 3rd-party transit service) infrastructure to get passengers from their origins to their destinations via one (or more) possible journeys (including multi-modal journey(s)) that may be optimised with respect to the passengers' preferences (e.g., duration, fare, number of transfers, etc.).

The system may include one or more of the following technical features:

(i) Multi-Modal Trips Generation: Given a road network, being a graph where nodes are streets (or intersections) and edges are intersections (or streets, respectively) connecting the nodes, and a transit network, being a graph where nodes are designated stops and edges are connections, a multi-modal network may be derived connecting the origin (O) to the destination (D), i.e., O→D, based on intelligent filtering of both networks' nodes (or vertices).

The road network and the transit network are generated in-house, based on OpenStreetMap (OSM) data source for the road network, and publicly available public transport data for the transit network.

(ii) Multi-Modal Optimal Trips Identification: Based on the derived multi-modal network, the system may perform an efficient multi-objective search to identify one or more optimal paths from the origin (O) to the destination (D) with respect to one or more preferences of the user or passenger.

Figure 1:
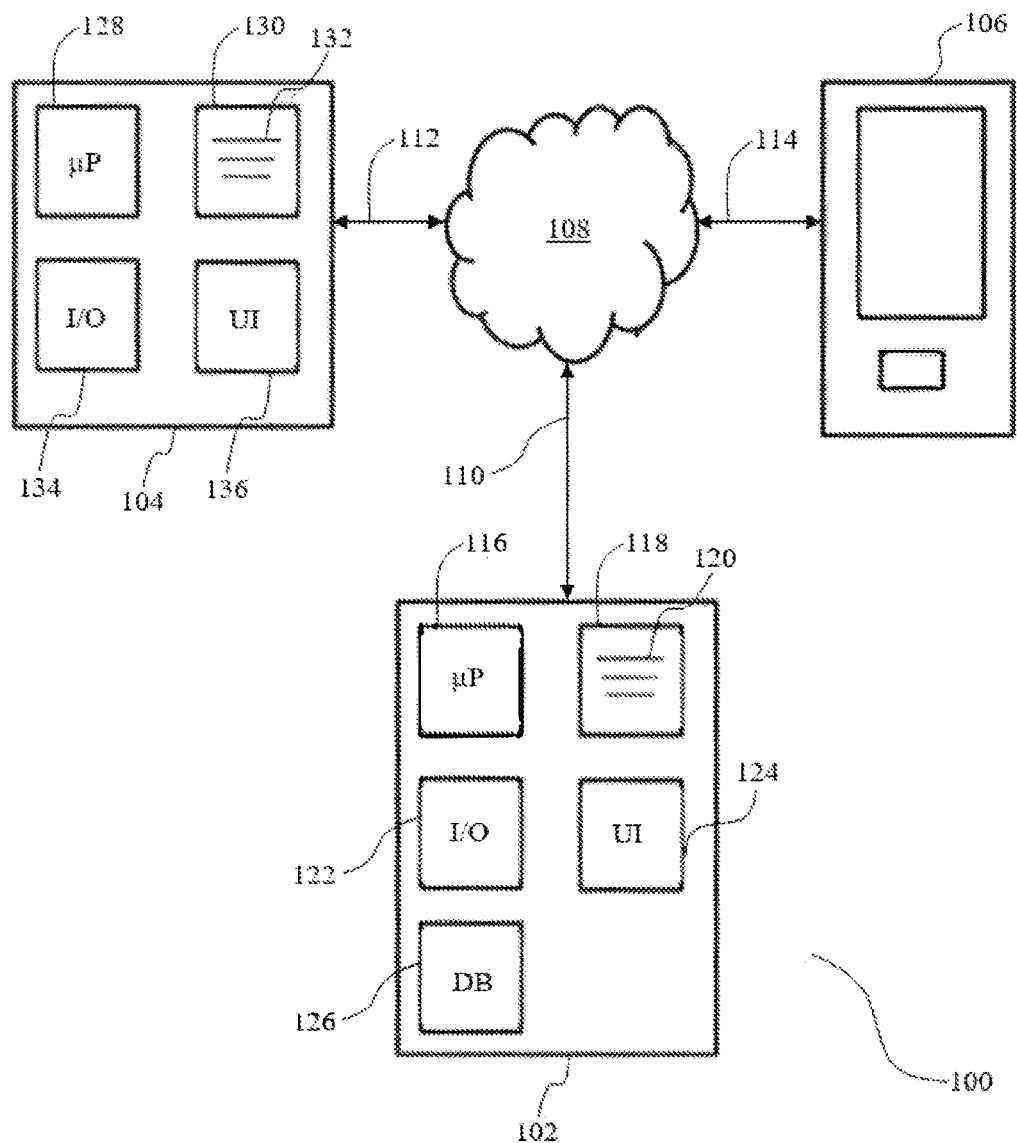
FIG. 1 is a schematic block diagram illustrating an exemplary communications system involving a communications server apparatus for managing a request for transport-related services.

Referring first to FIG. 1, a communications system 100 is illustrated, which may be applicable in various embodiments. The communications system 100 includes a communications server apparatus 102, a first user (or client) communications device 104 and a second user (or client) communications device 106. These devices 102, 104, 106 are connected in or to the communications network 108 (for example, the Internet) through respective communications links 110, 112, 114 implementing, for example, internet communications protocols. The communications devices 104, 106 may be able to communicate through other communications networks, such as public switched telephone networks (PSTN networks), including mobile cellular communications networks, but these are omitted from FIG. 1 for the sake of clarity. It should be appreciated that there may be one or more other communications devices similar to the devices 104, 106.

The communications server apparatus 102 may be a single server as illustrated schematically in FIG. 1, or have the functionality performed by the communications server apparatus 102 distributed across multiple server components. In the example of FIG. 1, the communications server apparatus 102 may include a number of individual components including, but not limited to, one or more microprocessors (µP) 116, a memory 118 (e.g., a volatile memory such as a RAM (random access memory)) for the loading of executable instructions 120, the executable instructions 120 defining the functionality the server apparatus 102 carries out under control of the processor 116. The communications server apparatus 102 may also include an input/output (I/O) module 122 allowing the server apparatus 102 to communicate over the communications network 108. User interface (UI) 124 is provided for user control and may include, for example, one or more computing peripheral devices such as display monitors, computer keyboards and the like. The communications server apparatus 102 may also include a database (DB) 126, the purpose of which will become readily apparent from the following discussion.

The user communications device 104 may include a number of individual components including, but not limited to, one or more microprocessors (µP) 128, a memory 130 (e.g., a volatile memory such as a RAM) for the loading of executable instructions 132, the executable instructions 132 defining the functionality the user communications device 104 carries out under control of the processor 128. User communications device 104 also includes an input/output (I/O) module 134 allowing the user communications device 104 to communicate over the communications network 108. A user interface (UI) 136 is provided for user control. If the user communications device 104 is, say, a smart phone or tablet device, the user interface 136 may have a touch panel display as is prevalent in many smart phone and other handheld devices. Alternatively, if the user communications device 104 is, say, a desktop or laptop computer, the user interface may have, for example, one or more computing peripheral devices such as display monitors, computer keyboards and the like.

The user communications device 106 may be, for example, a smart phone or tablet device with the same or a similar hardware architecture to that of the user communications device 104.

Figure 2A:
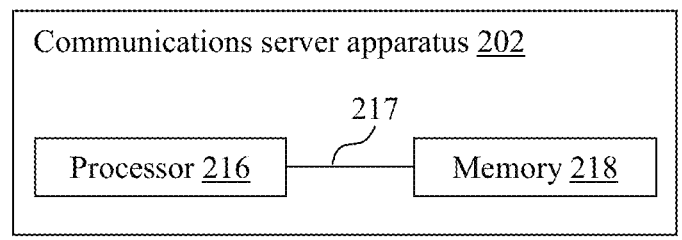
FIG. 2A shows a schematic block diagram illustrating a communications server apparatus for managing a request for transport-related services.
Figure 2B:
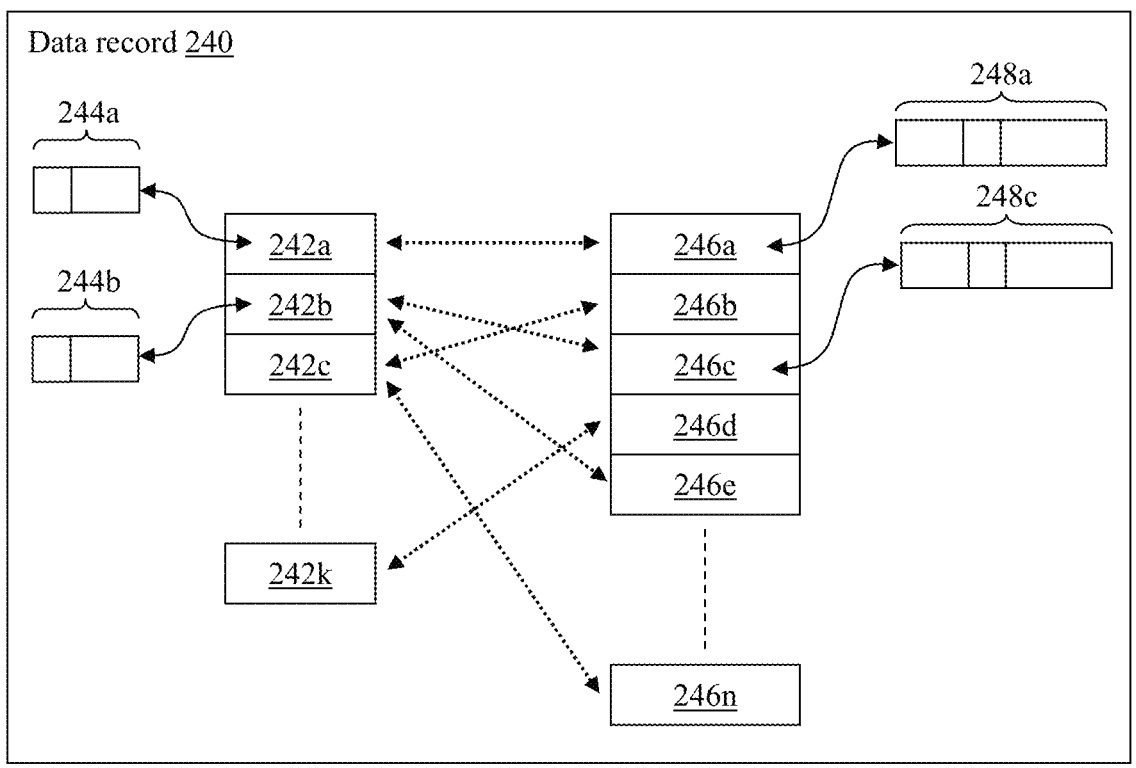
FIG. 2B shows a schematic block diagram illustrating a data record.

FIG. 2A shows a schematic block diagram illustrating a communications server apparatus 202 for managing a request for transport-related services, while FIG. 2B shows a schematic block diagram illustrating a data record 240 that may be generated by the communications server apparatus 202.

The communications server apparatus 202 includes a processor 216 and a memory 218, where the communications server apparatus 202 is configured, under control of the processor 216 to execute instructions stored in the memory 218 to, in response to receiving user request data including a data field indicative of an origin location and a data field indicative of a destination location, generate a data record 240 having a plurality of transit point data fields 242a, 242b, 242c, to 242k, having data (illustrated, as a non-limiting example, for the transit point data fields 242a, 242b as respective data 244a, 244b) for a corresponding plurality of transit points from the origin location to the destination location, the plurality of transit point data fields 242a, 242b, 242c, to 242k including a variable transit point data field (for example and for illustration purpose, data field 242b) having data 244b corresponding to a variable transit point that is determined based on data associated with at least one transportation network-related parameter, generate, in the data record 240, a plurality of trip section data fields 246a, 246b, 246c, 246d, 246e, to 246n, for a corresponding plurality of trip sections defining navigation directions from the origin location to the destination location, and, wherein, for each trip section data field 246a, 246b, 246c, 246d, 246e, to 246n, the communications server apparatus 202 is further configured to associate (illustratively represented by double-headed dotted arrows) the trip section data field 246a, 246b, 246c, 246d, 246e, to 246n with a respective transit point data field of the plurality of transit point data fields 242a, 242b, 242c, to 242k, and further configured to, based on the data 244a, 244b of the associated transit point data field 242a, 242b, 242c, to 242k, determine a respective transportation mode for the corresponding trip section and generate transit data (illustrated, as a non-limiting example, for the trip section data fields 246a, 246c as respective transit data 248a, 248c) in respect of the respective transportation mode. The processor 216 and the memory 218 may be coupled to each other (as represented by the line 217), e.g., physically coupled and/or electrically coupled. The processor 216 may be as described in the context of the processor 116 (FIG. 1) and/or the memory 218 may be as described in the context of the memory 118 (FIG. 1).

In other words, there may be provided a communications server apparatus 202 for managing a request for transport-related services, or for journey planning. The server apparatus 202 may receive user request data relating to a (booking) request by a user for transport-related services. The request may be made, for example, via a user communications device (e.g., a smart phone, tablet, handheld/portable communications device, desktop or laptop computer, etc.). In accordance with instructions stored in the memory 218 and executed by the processor 216, and responsive to receiving user request data including a data field indicative of an origin location (O) (or starting location) and a data field indicative of a destination location (D) (or ending location), the communications server apparatus 202 may generate a data record 240 having a plurality of transit point data fields 242a, 242b, 242c, to 242k, at least one of which is a variable transit point data field (e.g., 242*b*). Each of the plurality of transit point data fields 242*a*, 242*b*, 242*c*, to 242*k* may include data 244*a*, 244*b*, for a corresponding plurality of transit points from the origin location to the destination location. Data 244*b* corresponding to a variable transit point relating to the variable transit point data field 242*b* may be suitably determined based on data associated with at least one transportation network-related parameter (or condition). Data (e.g., 244*a*, 244*b*) may be transit point data, or part of a larger set of data of the corresponding plurality of transit points, or the corresponding transit point data field (e.g., 242*a*, 242*b*).

The communications server apparatus 202 may further generate in the data record 240, a plurality of trip (or route) section data fields 246*a*, 246*b*, 246*c*, 246*d*, 246*e*, to 246*n* for a corresponding plurality of trip sections (or segments or legs) to define navigation directions from O to D, or to cover the journey from O to D. The plurality of trip sections may include successive or connecting trip sections from O to D.

The plurality of transit point data fields 242*a*, 242*b*, 242*c*, to 242*k*, and the plurality of trip section data fields 246*a*, 246*b*, 246*c*, 246*d*, 246*e*, to 246*n* may be arranged in any suitable manner in the data record 240.

It should be appreciated that there may be any number of transit point data fields 242*a*, 242*b*, 242*c*, to 242*k*, and/or any number of trip section data fields 246*a*, 246*b*, 246*c*, 246*d*, 246*e*, to 246*n*. The number of trip section data fields 246*a*, 246*b*, 246*c*, 246*d*, 246*e*, to 246*n* may be higher than the number of transit point data fields 242*a*, 242*b*, 242*c*, to 242*k*.

For each trip section data field 246*a*, 246*b*, 246*c*, 246*d*, 246*e*, to 246*n*, the communications server apparatus 202 may be further configured to associate the trip section data field 246*a*, 246*b*, 246*c*, 246*d*, 246*e*, to 246*n* with a respective transit point data field of the plurality of transit point data fields 242*a*, 242*b*, 242*c*, to 242*k*. As non-limiting examples, as illustrated by the double-headed dotted arrows in FIG. 2B, trip section data field 246*a* may be associated with transit point data field 242*a*, trip section data field 246*b* may be associated with transit point data field 242*c*, trip section data field 246*c* may be associated with transit point data field 242*b*, trip section data field 246*d* may be associated with transit point data field 242*k*, trip section data field 246*e* may be associated with transit point data field 242*b*, etc.

For each trip section data field (e.g., using data field 246*a* as a non-limiting example), the communications server apparatus 202 may be further configured to, based on the data (e.g., 244*a*) of the associated transit point data field (e.g., 242*a*), determine a respective transportation mode for the corresponding trip section and generate transit data (e.g., 248*a*) in respect of the respective transportation mode. Transit data (e.g., 248*a*, 248*c*) may be part of a larger set of data of the corresponding trip section data field (e.g., 246*a*, 246*c*).

Transit point data (e.g., 244*a*, 244*b*) and transit data (e.g., 248*a*, 248*c*) may be transmitted or provided for display/presentation to the user or for selection by the user. Such data may be transmitted to the communications device of the user who made the request.

The data record 240 may be stored in the memory 218, or as part of a database (e.g., 126, FIG. 1) of the communications server apparatus 202.

The plurality of trip section data fields 246*a*, 246*b*, 246*c*, 246*d*, 246*e*, to 246*n* and the plurality of transit point data fields 242*a*, 242*b*, 242*c*, to 242*k* may be generated to define a plurality of journey options from the origin location to the destination location, wherein each journey option of the plurality of journey options may be defined by at least two trip section data fields of the plurality of trip section data fields 246*a*, 246*b*, 246*c*, 246*d*, 246*e*, to 246*n*, and wherein the at least two trip section data fields are for corresponding trip sections defining the navigation directions for a single journey starting from the origin location and ending at the destination location. The plurality of journey options may include at least one multi-modal journey option.

A "multi-modal" journey option may mean a journey option having at least two trip sections associated with respective different transportation modes. In other words, the at least two trip sections of a multi-modal journey option may be served by different transportation modes (i.e., multi-modal).

As described, each trip section (or trip section data field 246*a*, 246*b*, 246*c*, 246*d*, 246*e*, to 246*n*) may have an associated or corresponding transit point (or transit point data field 242*a*, 242*b*, 242*c*, to 242*k*). A respective transit point may mean a start point or an end point for a respective trip section. The variable transit point may refer to a point or location from which the user may commence the trip section associated with the variable transit point, or where the user may end or stop the trip section.

Apart from the variable transit point, the plurality of transit points may include one or more fixed transit points and/or one or more other variable transit points. This may mean that the plurality of transit point data fields 242*a*, 242*b*, 242*c*, to 242*k* may include one or more fixed transit point data fields having data corresponding to fixed transit point(s), and, one or more variable transit point data fields having data corresponding to variable transit point(s).

A "fixed transit point" may be associated with a trip section being served by a schedule-based/fixed (timetable) transportation mode/service (e.g., LRT, MRT, trains, buses, ferries, etc.). As such, a fixed transit point may be associated with a fixed/schedule-based trip section. As non-limiting examples, fixed transit points may correspond to train stations, bus stops, or ferry terminals, etc.

A "variable transit point" may be associated with a trip section being served by an on-demand/variable transportation mode/service (e.g., ride-hailing or ride-sharing service, etc.). As such, a variable transit point may be associated with a variable/on-demand trip section. A variable transit point is not constrained by the presence of fixed services, and the location of variable transit point may potentially change, as determined based on data associated with the at least one transportation network-related parameter.

It should be appreciated that the variable transit point (or the data thereof) is determined based on data associated with at least one transportation network-related parameter, rather than being arbitrarily chosen, or merely a transit point that is fixed to a "current" position of the user. For example, for a user wanting to start on a trip section associated with a variable transit point, the variable transit point may not necessarily be the exact location of where the user may currently be at; rather, information relating to the at least one transportation network-related parameter may be processed or analysed to determine a suitable variable transit point for commencing said trip section, which may be away from the "current" position of the user.

As non-limiting examples, the plurality of transit point data fields 242*a*, 242*b*, 242*c*, to 242*k* and the corresponding data 244*a*, 244*b* may be generated by a transit point ranking engine (or circuit or module) of the apparatus 202. The plurality of trip section data fields 246*a*, 246*b*, 246*c*, 246*d*, 246*e*, to 246*n* may be generated by a routing engine (or circuit or module) of the apparatus 202. The routing engine may include a predictive pricing engine, a time-dependent routing engine, and a time-independent routing engine to provide the trip sections and parameterise them with the criteria of interest (e.g., duration, fare, number of transfer as part of the transit data). One or more of the transit point ranking engine, the predictive pricing engine, the time-dependent routing engine, and the time-independent routing engine may be part of the processor 216 or implemented by the processor 216.

In various embodiments, the plurality of trip sections and the plurality of transit points may define a plurality of journey options (or candidate journeys) starting from the origin location and ending at the destination location. This may mean that, responsive to the user request data, a plurality of multi-modal journey options (or candidate multi-modal journeys) may be generated for the trip from O to D. The plurality of trip sections and the plurality of transit points may be defined into respective journey options. A journey option may include at least some of the plurality of trip sections and at least one transit point. One entire journey option may be defined by two or more of the plurality of trip sections. It should be appreciated that one or more of the plurality of trip sections may be defined in more than one journey option, and/or one or more of the plurality of transit points may be defined in more than one journey option. This may mean that a trip section and/or a transit point may be shared by or common to two or more journey options. The plurality of journey options may include at least one multi-modal journey option.

In various embodiments, the at least one transportation network-related parameter may include a dynamic transportation network-related parameter. For example, information relating to the at least one transportation network-related parameter may be variable in real time.

In various embodiments, the plurality of transit point data fields 242a, 242b, 242c, to 242k may include a plurality of variable transit point data fields (for example, including data field 242b), each variable transit point data field of the plurality of variable transit point data fields having data corresponding to a respective variable transit point that may be determined based on the data associated with the at least one transportation network-related parameter. Each variable transit point data field may be associated with a trip section data field of the at least two trip section data fields of a respective journey option of the plurality of journey options.

The communications server apparatus 202 may be further configured (under control of the processor 216 to execute instructions stored in the memory 218) to identify, from the plurality of journey options, and based on the transit data (e.g., 248a, 248c) corresponding to the at least two trip section data fields defining the each journey option, one or more pareto-optimal journey options. A pareto-optimal journey option may be optimised with respect to one or more components of the transit data, e.g., at least one of duration, fare, or number of transfer. The one or more pareto-optimal journey options may be identified using a multi-objective shortest path engine (or circuit or module) of the apparatus 202, for example, as part of the processor 216.

The communications server apparatus 202 may be further configured (under control of the processor 216 to execute instructions stored in the memory 218) to, based on a defined epsilon resolution value, control the number of pareto-optimal journey options to be identified. This may be achieved based on the value of epsilon resolution that may be defined or specified.

In various embodiments, a road network and, separately, a transit network, may be stored in the memory 218, and wherein the plurality of transit point data fields 242a, 242b, 242c, to 242k and the plurality of trip section data fields 246a, 246b, 246c, 246d, 246e, to 246n may be generated using data corresponding to the road network and the transit network. The "road network" is a time-independent network and associated with demand/variable transportation modes or services, while the "transit network" is a time-dependent network and associated with schedule-based/fixed transportation modes or services. By keeping the road network and the transit network separately, a suitable routing algorithm may be applied to each of the networks. As non-limiting examples, Contraction Hierarchy Algorithm may be employed for the road network, while Connection Scan Algorithm may be employed for the transit network.

The communications server apparatus 202 may be further configured (under control of the processor 216 to execute instructions stored in the memory 218) to provide data update to at least one of the road network or the transit network in real time. As a result of maintaining the two networks separately, updates may be provided separately to the respective networks.

In various embodiments, the respective transportation mode for the trip section data field (e.g., 246c) associated with the variable transit point data field (e.g., 242b) may include a ride-sharing transportation mode. This may include, for example, car-sharing, car-pooling or bicycle-sharing.

In various embodiments, the respective transportation mode for the trip section data field (e.g., 246c) associated with the variable transit point data field (e.g., 242b) may include a ride-hailing transportation mode. This may include, for example, car-hailing, or (motor)bike-hailing.

In various embodiments, the data associated with the at least one transportation network-related parameter may correspond to at least one of a supply of drivers, accessibility (of the variable transit point) to the user, a fare surge-related parameter, or a detour-related parameter.

In embodiments where the data associated with the at least one transportation network-related parameter corresponds to the fare surge-related parameter, the communications server apparatus 202 may be further configured (under control of the processor 216 to execute instructions stored in the memory 218) to generate, in the data record 240, a plurality of initial variable transit point data fields for a corresponding plurality of initial variable transit points from the origin location (O) to the destination location (D), determine, for each initial variable transit point data field of the plurality of initial variable transit point data fields, a value (e.g., a surge multiplier value) for the fare surge-related parameter, and, if an initial variable transit point data field of the plurality of initial variable transit point data fields has the value above a threshold value indicative of high risk of fare surging, disregard (or remove) the initial variable transit point corresponding to the initial variable transit point data field, and, if an initial variable transit point data field of the plurality of initial variable transit point data fields has the value below the threshold value, maintain the initial variable transit point corresponding to the initial variable transit point data field as a candidate for the variable transit point (e.g., corresponding to variable transit point data field 242b). By setting a threshold value as a cut-off point that represents high risk of fare surging, and making comparison relative to the threshold value, variable transit points which may be prone to fare surging or having a high fare surging risk may be discarded from consideration.

In embodiments where the data associated with the at least one transportation network-related parameter corresponds to the detour-related parameter, the communications server apparatus 202 may be further configured (under control of the processor 216 to execute instructions stored in the memory 218) to generate, in the data record 240, a plurality of primary variable transit point data fields for a corresponding plurality of primary variable transit points from the origin location (O) to the destination location (D), determine, for each primary variable transit point data field of the plurality of primary variable transit point data fields, a (ranking or importance) value for the detour-related parameter, and, if a primary variable transit point data field of the plurality of primary variable transit point data fields has the value above a threshold value indicative of minimal detour, maintain the primary variable transit point corresponding to the primary variable transit point data field as a candidate for the variable transit point (e.g., corresponding to variable transit point data field 242b), and, if a primary variable transit point data field of the plurality of primary variable transit point data fields has the value below the threshold value, disregard (or remove) the primary variable transit point corresponding to the primary variable transit point data field. By setting a threshold value as a cut-off point that represents minimal detour, and making comparison relative to the threshold value, variable transit points which minimise detour may be maintained for consideration. The term "primary" as used herein mean "initial" and has been used to differentiate from the term "initial variable transit points" described above in relation to the fare surge-related parameter.

In various embodiments, the communications server apparatus 202 may be further configured (under control of the processor 216 to execute instructions stored in the memory 218) to update, in a trip section data field of the plurality of trip section data fields 246a, 246b, 246c, 246d, 246e, to 246n, a travel progress of the user through the corresponding trip section; and provide an alert to the user, via the user's communication device, prior to the end of the corresponding trip section (e.g., towards the end of the corresponding trip section).

Figure 2C:
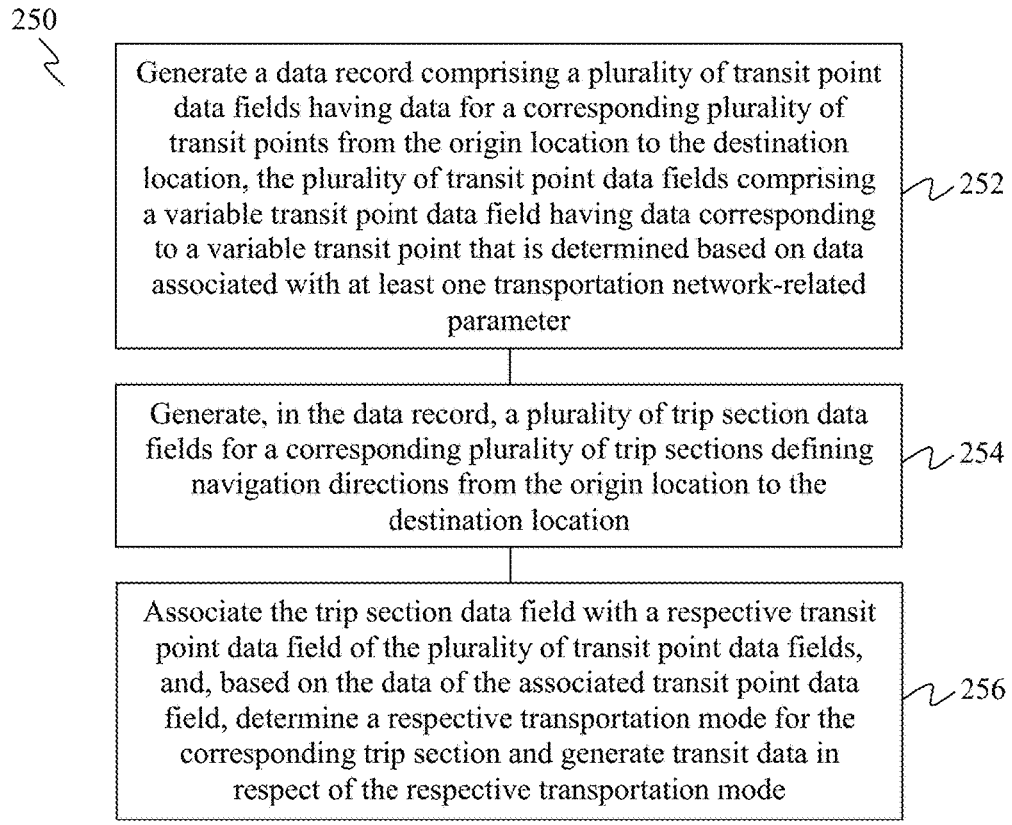
FIG. 2C shows a flow chart illustrating a method performed in a communications server apparatus for managing a request for transport-related services.

FIG. 2C shows a flow chart 250 illustrating a method, performed in a communications server apparatus for managing a request for transport-related services, and under control of a processor of the communications server apparatus. In response to receiving user request data including a data field indicative of an origin location (O) and a data field indicative of a destination location (D), at 252, a data record is generated including a plurality of transit point data fields having data for a corresponding plurality of transit points from the origin location to the destination location, the plurality of transit point data fields including a variable transit point data field having data corresponding to a variable transit point that is determined based on data associated with at least one transportation network-related parameter, at 254, a plurality of trip section data fields are generated in the data record for a corresponding plurality of trip sections defining navigation directions from the origin location to the destination location, and, at 256, for each trip section data field, the trip section data field is associated with a respective transit point data field of the plurality of transit point data fields, and further, based on the data of the associated transit point data field, a respective transportation mode is determined for the corresponding trip section and transit data is generated in respect of the respective transportation mode.

In various embodiments, the plurality of trip section data fields and the plurality of transit point data fields may be generated to define a plurality of journey options from the origin location to the destination location, wherein each journey option of the plurality of journey options may be defined by at least two trip section data fields of the plurality of trip section data fields, and wherein the at least two trip section data fields may be for corresponding trip sections defining the navigation directions for a single journey starting from the origin location and ending at the destination location. The plurality of journey options may include at least one multi-modal journey option.

The plurality of transit point data fields may include a plurality of variable transit point data fields, each variable transit point data field of the plurality of variable transit point data fields having data corresponding to a respective variable transit point that may be determined based on the data associated with the at least one transportation network-related parameter. Each variable transit point data field may be associated with a trip section data field of the at least two trip section data fields of a respective journey option of the plurality of journey options.

The method may further include identifying, from the plurality of journey options, and based on the transit data corresponding to the at least two trip section data fields defining the each journey option, one or more pareto-optimal journey options. The method may further include controlling, based on a defined epsilon resolution value, the number of pareto-optimal journey options to be identified.

In various embodiments, the plurality of transit point data fields and the plurality of trip section data fields may be generated from a road network and a transit network that are maintained separately. Data update may be provided to at least one of the road network or the transit network in real time.

In various embodiments, the respective transportation mode for the trip section data field associated with the variable transit point data field may include a ride-sharing transportation mode.

In various embodiments, the respective transportation mode for the trip section data field associated with the variable transit point data field may include a ride-hailing transportation mode.

In various embodiments, the data associated with the at least one transportation network-related parameter may correspond to at least one of a supply of drivers, accessibility to the user, a fare surge-related parameter, or a detour-related parameter.

In embodiments where the data associated with the at least one transportation network-related parameter corresponds to the fare surge-related parameter, the method may further include generating, in the data record, a plurality of initial variable transit point data fields for a corresponding plurality of initial variable transit points from the origin location to the destination location, determining, for each initial variable transit point data field of the plurality of initial variable transit point data fields, a value for the fare surge-related parameter, and, if an initial variable transit point data field of the plurality of initial variable transit point data fields has the value above a threshold value indicative of high risk of fare surging, disregarding the initial variable transit point corresponding to the initial variable transit point data field, and, if an initial variable transit point data field of the plurality of initial variable transit point data fields has the value below the threshold value, maintaining the initial variable transit point corresponding to the initial variable transit point data field as a candidate for the variable transit point.

In embodiments where the data associated with the at least one transportation network-related parameter corresponds to the detour-related parameter, the method may further include generating, in the data record, a plurality of primary variable transit point data fields for a corresponding plurality of primary variable transit points from the origin location to the destination location, determining, for each primary variable transit point data field of the plurality of primary variable transit point data fields, a value for the detour-related parameter, and, if a primary variable transit point data field of the plurality of primary variable transit point data fields has the value above a threshold value indicative of minimal detour, maintaining the primary variable transit point corresponding to the primary variable transit point data field as a candidate for the variable transit point, and, if a primary variable transit point data field of the plurality of primary variable transit point data fields has the value below the threshold value, disregarding the primary variable transit point corresponding to the primary variable transit point data field.

The method may further include updating, in a trip section data field of the plurality of trip section data fields, a travel progress of the user through the corresponding trip section, and providing an alert to the user, via the user's communication device, prior to the end of the corresponding trip section.

It should be appreciated that descriptions in the context of the communications server apparatus 202 may correspondingly be applicable in relation to the method as described in the context of the flow chart 250, and vice versa.

There may also be provided a computer program product having instructions for implementing the method for managing a request for transport-related services as described herein.

There may also be provided a computer program having instructions for implementing the method for managing a request for transport-related services as described herein.

There may further be provided a non-transitory storage medium storing instructions, which, when executed by a processor, cause the processor to perform the method for managing a request for transport-related services as described herein.

Various embodiments may further provide a communications system for managing a request for transport-related services, having a communications server apparatus, at least one user communications device and communications network equipment operable for the communications server apparatus and the at least one user communications device to establish communication with each other therethrough, wherein the at least one user communications device includes a first processor and a first memory, the at least one user communications device being configured, under control of the first processor, to execute first instructions stored in the first memory to, in response to receiving first request data including a data field indicative of an origin location and a data field indicative of a destination location, generate data corresponding to the origin location and the destination location, and transmit the data for receipt by the communications server apparatus for processing, and, wherein the communications server apparatus includes a second processor and a second memory, the communications server apparatus being configured, under control of the second processor, to execute second instructions stored in the second memory to, in response to receiving second request data indicative of the data transmitted by the at least one user communications device, generate a data record including a plurality of transit point data fields having data for a corresponding plurality of transit points from the origin location to the destination location, the plurality of transit point data fields including a variable transit point data field having data corresponding to a variable transit point that is determined based on data associated with at least one transportation network-related parameter, generate, in the data record, a plurality of trip section data fields for a corresponding plurality of trip sections defining navigation directions from the origin location to the destination location, wherein, for each trip section data field, the communications server apparatus is further configured to associate the trip section data field with a respective transit point data field of the plurality of transit point data fields, and further configured to, based on the data of the associated transit point data field, determine a respective transportation mode for the corresponding trip section and generate transit data in respect of the respective transportation mode, and, transmit, for receipt by the at least one user communications device, data corresponding to the plurality of trip sections, and, for each trip section of the plurality of trip sections, data corresponding to a respective transit point associated with the trip section, data corresponding to a respective transportation mode for the trip section and the transit data in respect of the respective transportation mode.

Various embodiments may address one or more issues by one or both of the following features: (i) creation of a multi-modal network that encodes possible competitive multi-modal trips from the origin (O) to the destination (D), O→D, (ii) inference on the created multi-modal network in feature (i) above to extract favourable multi-modal trips with regard to one or more criteria.

A multi-modal trip includes two or more legs, each of which may be served by a different mode of transport. In general, modes of transport may be one of two types: on-demand/variable (e.g., ride-sharing or ride-hailing transportation mode/service, for example, GrabCar, GrabBike, GrabTaxi, GrabCycle, etc.) or schedule-based/fixed (timetable) services (e.g., LRT, MRT, trains, buses, ferries, etc.).

On the one hand, single-mode trips may be optimal with regard to a specific criterion, for example, public transport offers a cheap means for O→D at the expense of time and the number of transfers, whereas taxis typically offer a quick convenient way to get from O to D.

On the other hand, multi-modal trips may offer a trade-off between two or more criteria (e.g., fare, time, and number of transfers).

Figure 3:
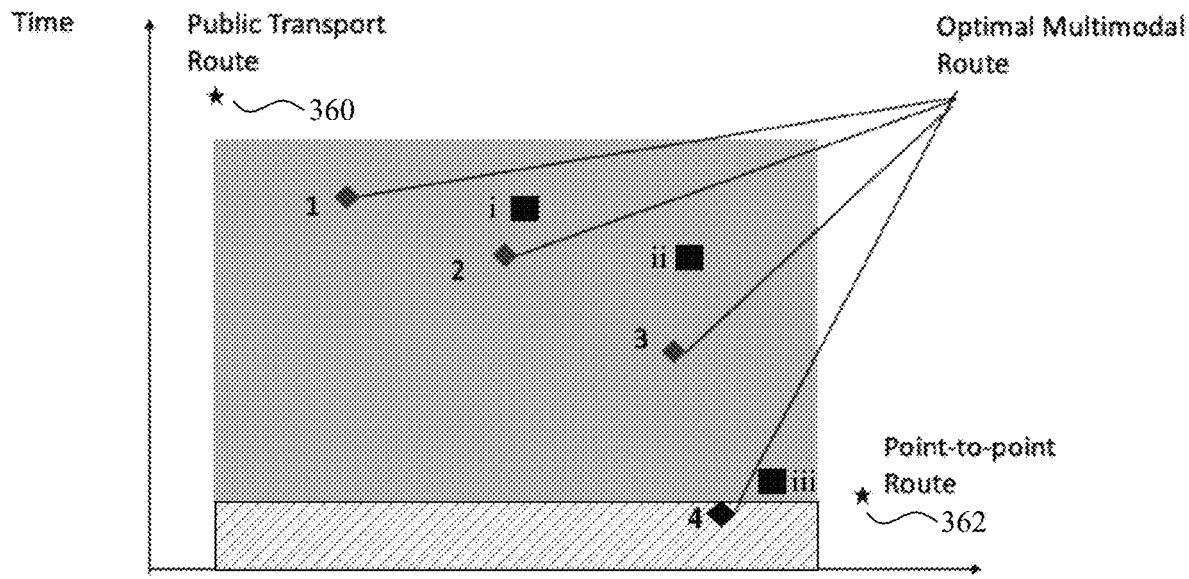
FIG. 3 shows an example of the comparison of multi-modal trips in the Time-Price space.

FIG. 3 shows an example of how multi-modal trips may be compared in the Time-Price space, illustrating the trade-off between Time and Price for different multi-modal routes or journey options. FIG. 3 further illustrates the approach of pareto Optimality being used in multimodal route recommendation.

Multi-modal routes having a public transport leg or trip section is a travel option for "sandwich" passengers, who want to have a faster trip than a pure public transport one but a cheaper trip than a point-to-point one. In FIG. 3, "Time" on the y-axis is used to denote a generalised measure of travelling time, number of transfers, walking time, etc. Pure public transport route (represented by star 360), multi-modal routes or journey options (represented by closed squares labelled "i", "ii", "iii", and closed diamonds labelled "1", "2", "3", "4" for different journey options) and point-to-point route (represented by star 362) may be classified by the time and the price of the trip as shown in FIG. 3. Each of the closed squares "i" to "iii" and closed diamonds "1" to "4" represents a feasible multi-modal journey option, with the closed diamonds "1" to "4" further representing optimal multi-modal journey options. The multi-modal journey option represented by diamond "4" illustrates the ideal, but sometimes rare case, whose time is even shorter than the point-to-point route 362. As may be observed, multimodal trips may offer solutions with traded-off objective function that is somewhere in between the public transport route (represented by star 360) and the point-to-point route (represented by star 362).

The optimality condition could be stated as follows:

A multi-modal route ω is pareto-optimal if and only if there is no other route υ such that (Time$_υ$,Price$_υ$)≤(Time$_ω$, Price$_ω$), where "≤" is a vector inequality sign, a≤b means a$_i$≤b$_i$∀$_i$ (where "∀" means "for all") and a≠b.

Pareto Optimality will be described further below.

Finding an optimal single-mode trip is usually treated as a shortest path problem on a network of paths (graph) of the corresponding transport mode. With multi-modal trips or journeys, there is a need to consider networks of two different types; time-dependent network (or transit network) (e.g., MRT), and time-independent network (or road network) (e.g., ride-hailing service). Different routing algorithms may be applied to the different networks, for example, Contraction Hierarchy Algorithm for the road network, and Connection Scan Algorithm for the transit network.

The road network and the transit network are maintained separately in various embodiments, which allows the use of suitable routing algorithm for each of the networks. A high-level light-weight network (or multi-modal network) may be constructed, whose nodes represent transit points from one mode (one network type, respectively) to another. A non-limiting example of such multi-modal network is shown in FIG. 4.

Figure 4:
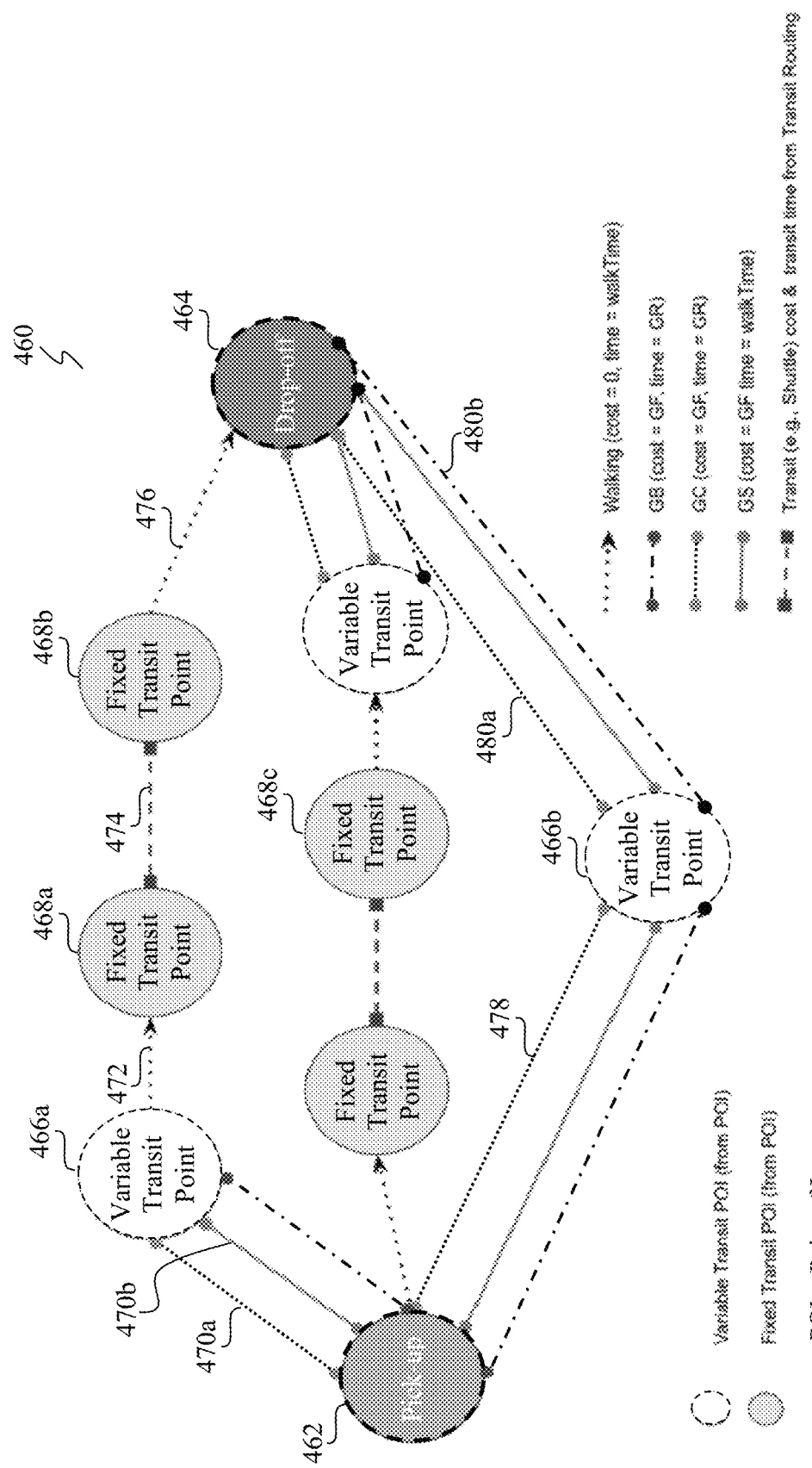
FIG. 4 shows an example of a multi-modal network.

FIG. 4 shows an example of a derived multi-modal network 460 from origin location (O) (or pick-up) 462 to destination location (D) (or drop-off) 464. There may be provided or generated a plurality of transit points (which data may be provided in respective transit point data fields) in between the origin 462 and the destination 464, one or more of which may be variable transit points (represented by 466a, 466b for two such variable transit points), and one or more of which may be fixed transit points (represented by 468a, 468b, 468c for three such fixed transit points). Variable transit points such as points 466a, 466b denote the start (or end) of variable/on-demand legs or trip sections, while fixed transit points such as points 468a, 468b, 468c denote the start (or end) of fixed/schedule-based services. The acronym "POI" in FIG. 4 means "Point of Interest" which refers to a specific point in the map in consideration. In various embodiments, the transit points are the POI, where there are fixed POI (e.g., bus stop, MRT station, etc.) and variable POI (one or more transit points may be chosen by Contraction Hierarchy Algorithm).

A plurality of journey options, including multi-modal journey options, may be defined from the origin 462 to the destination 464, through the plurality of transit points. As a non-limiting example, a first journey option includes trip sections (or links or legs) 470a, 472, 474, 476, the variable transit point 466a, and the fixed transit points 468a, 468b, where the first journey option is a multi-modal journey option. As another example, there is a second journey option with trip sections 470b, 472, 474, 476 and the same transit points 466a, 468a, 468b. As further non-limiting examples, there may be generated a third journey option with trip sections 478, 480a, and a fourth journey option with trip sections 478, 480b, where both journey options include the same variable transit point 466b. Information or data relating to various trip sections, e.g., 470a, 470b, 472, 474, etc. may be provided in respective trip section data fields.

Different trip sections may correspond to or be served by respective transportation modes or services. For example, there may be walking involved in the trip section 472. Trip sections such as the trip section 474 in between the two fixed transit points 468a, 468b may correspond to a fixed/schedule-based transportation mode such as shuttle, bus, MRT, etc. Trip sections associated with or linking to a variable transit point, for example, trip sections 470a, 470b, 480b may correspond to variable/on-demand transportation mode/service such as a ride-sharing service or a ride-hailing service.

In FIG. 4, the acronyms "GB" refers to GrabBike (a ride-hailing service), "GC" refers to GrabCar (a ride-hailing service), and "GS" refers to GrabShare (a ride-sharing service). The acronym "GF" refer to GrabFare, which is an internal API (application programming interface) service to help determine the fares of certain journeys. Further, the acronym "GR" refers to GrabRoad, which is an internal API service related to routing, where this service may be called or initiated to determine the duration of certain journeys.

The routing on each trip section or link may be done based on the type of the trip section. As non-limiting examples, Connection Scan Algorithm may be used for trip sections represented by a dashed line with double ended squares (e.g., trip section 474), Contraction Hierarchies (or Contraction Hierarchy Algorithm) may be used for trip sections represented by a dotted line with double ended circles (e.g., trip sections 470a, 478, 480a). In various embodiments, Connection Scan Algorithm may be used for trip sections corresponding to fixed/schedule-based transportation mode/service, while Contraction Hierarchies may be used for trip sections corresponding to variable/on-demand transportation mode/service.

The transit points may be OD-dependent and/or time-dependent. This applies generally in determining the transit points (both variable and fixed) to be included into optimal routes. By "OD-dependent", it is meant that a transit point may be determined from the networks such that minimal detour is incurred in a multi-modal journey as compared to or over a route taken by a user or passenger using a single-mode journey from O to D. By "time-dependent", it is meant that a transit point may be determined such that allocation for subsequent on-demand/variable legs is maximised and the discrepancy between forecasted and actual fares may be minimised.

For maximising allocation (or assignment of user to driver of on-demand transport services), variable transit points having a better amount of supply (i.e., driver) may be recommended for the journey options.

In order to minimise any difference between forecasted and actual fares, various embodiments may manage the risk of price surging by tracking real-time condition and incorporating predictive model in choosing transit points and creating routes. Fares may be forecasted based on one or more of the following: the estimated time of arrival of passenger to the respective transit points (e.g., by shortest path algorithm for variable trip section and by Connecting Scan Algorithm for fixed trip section), supply (driver availability), demand (number of booking), and surge forecasting at the respective transit points (e.g., by Naïve Forecasting and Machine Learning Model).

As compared to known systems having only one type of transit points in the form of fixed transit points which typically correspond to bus stops, MRT stations, or other public transport facilities, the multi-modal network of various embodiments, e.g., multi-modal network 460 (FIG. 4) further includes one or more variable transit points which are not constrained by the presence of fixed transport service. Further, determination of variable transit points may form part of decision variable in various embodiments.

Variable transit points may be determined or chosen based on either or both of the following:

(1) The variable transit points are accessible and suitable for picking-up and dropping off passengers. This may be achieved by leveraging on historical booking data and making inference and validation from the data.

Figure 10B:
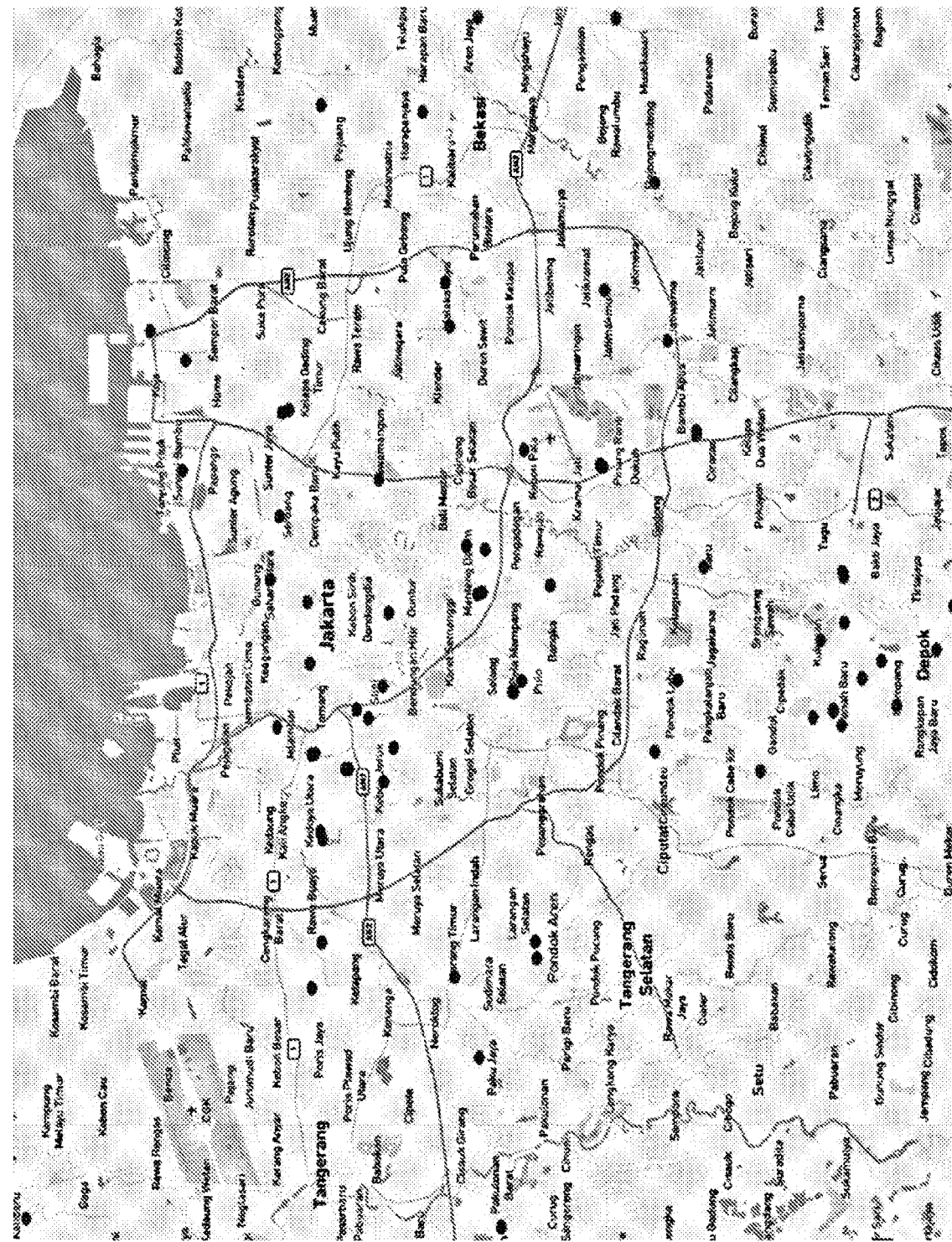
FIG. 10B shows the top 100 nodes determined for part of Jakarta, Indonesia.

(2) The variable transit points should not incur too much detour. This may be achieved by implementing Contraction Hierarchy (CH) Algorithm. In this algorithm, nodes are first ordered by 'importance'. A "hierarchy" is then generated by iteratively "contracting" the least important node. Contracting a node, e.g., node u, means replacing shortest paths going through said node by shortcuts (e.g., see FIG. 10A to be described further below). A high importance indicates that the corresponding street segment is part of many shortest paths in relative to the number of street segments it connects to. In other words, a trip's route is more likely to be passing through some of such street segments than the rest of the network. This approach captures both accessibility and minimum detour criterion. An example of the CH algorithm output is shown in FIG. 10B to be described further below.

The implementation of variable transit points in various embodiments, in addition to fixed transit points, may open up more route possibility which subsequently may increase the chance of getting one or more optimal journey options or routes recommended. Further, the variable transit points may be determined with consideration of accessibility (e.g., based on historical booking data) and/or less detour (e.g., by means of Contraction Hierarchy Algorithm).

Figure 5A:
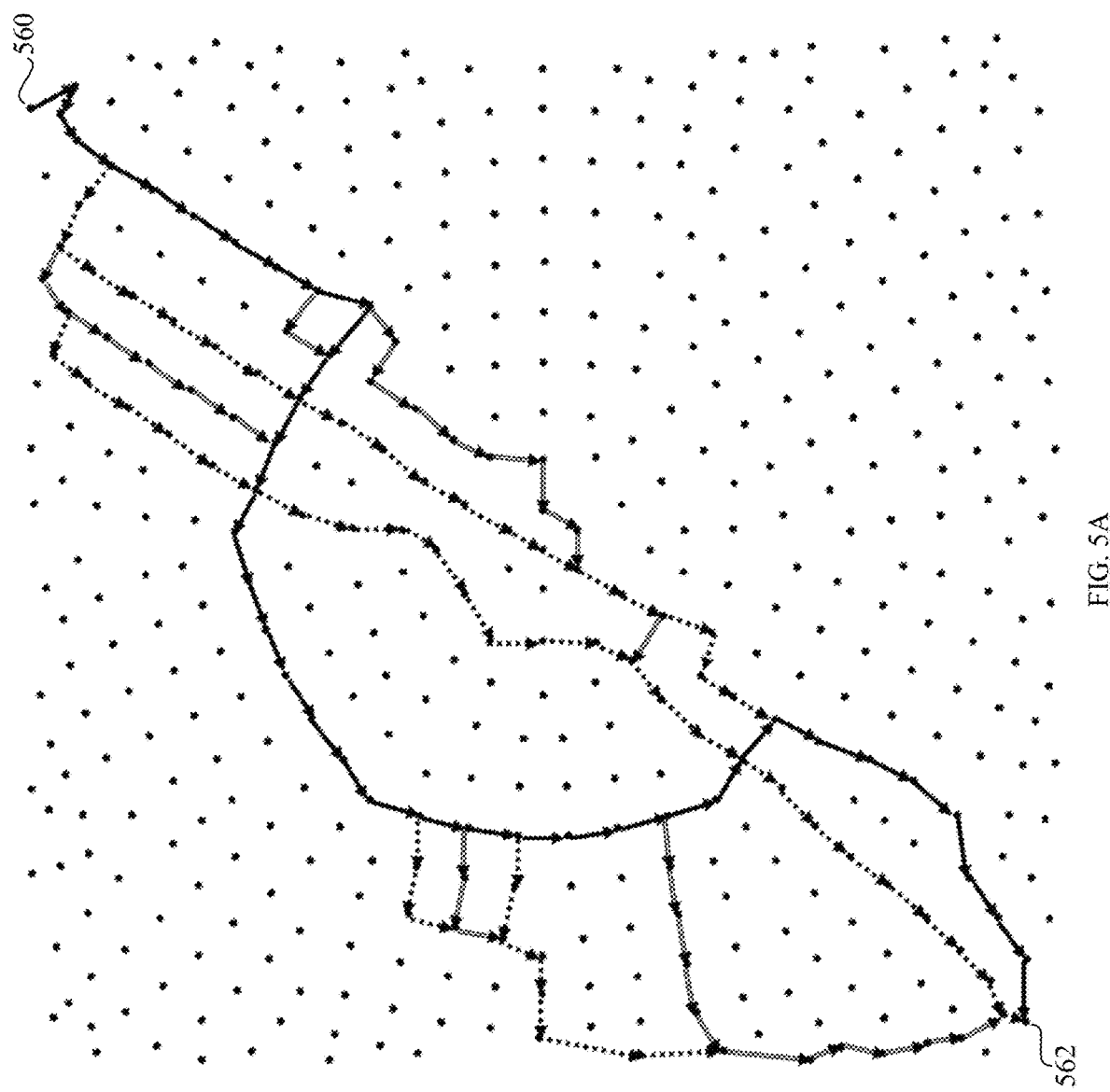
FIG. 5A shows an example illustrating possible optimal multi-modal paths from a top-right node to a bottom-left node.

The derived network, as shown in the example of FIG. 4 provides or encodes possible multi-modal journey options or itineraries. However, there may be instances where not all of the generated journey options are optimal. FIG. 5A shows an example illustrating possible optimal multi-modal paths (traced by the plurality of arrows) from a top-right node 560 to a bottom-left node 562. Different types of arrows (solid arrows, dotted arrows, etc.) are provided in FIG. 5A to represent different transportation modes so as to show that there are various different possible multi-modal paths/choices to go from the top-right node 560 to the bottom-left node 562, via a plurality of different nodes (nodes are represented by solid circles in FIG. 5A). Each path combination from the node 560 to the node 562 may result in different performance objectives in terms of time and fare as shown in FIG. 5B to be described further below.

For each multi-modal path or route generated in FIG. 5A, its associated time and fare may be determined or calculated. By taking the normalized value of time (f1) and fare (f2), and plotting them into a 2D space of time and fare, the multi-modal paths may be projected to the 2D space graphs illustrated in FIG. 5B, where each point (open and closed circles) in FIG. 5B represents a generated multi-modal journey option. Points (represented by closed circles) in the shaded area denote dominated (i.e., suboptimal multi-modal journey options or itineraries) whereas points (represented by open circles) at the front of the shaded region denotes pareto-optimal (incomparable or non-dominated) multi-modal journey options.

Figure 5B:
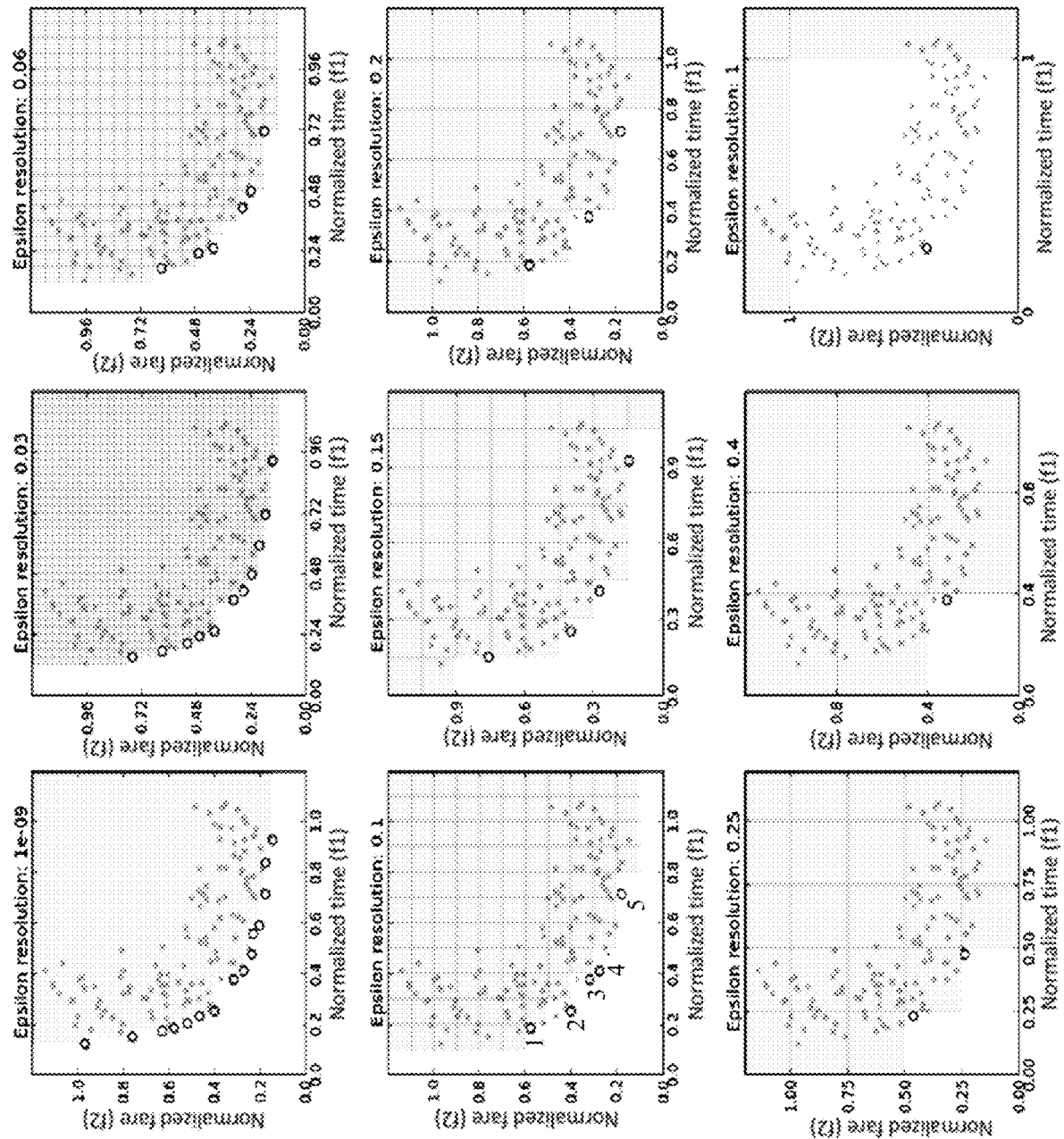
FIG. 5B shows results of filtering pareto-optimal multi-modal itineraries in the 2D space of time and fare.

The number of recommended optimal multi-modal journey options may be controlled based on the approach of epsilon-dominance as shown in FIG. 5B. Various epsilon resolution values is presented in FIG. 5B to show that different resolutions provide different numbers of pareto-optimal multimodal itineraries. As non-limiting examples, an epsilon resolution of 1 may provide one pareto-optimal journey option or itinerary, an epsilon resolution of 0.25 may provide two pareto-optimal journey options, and an epsilon resolution of 0.2 may provide three pareto-optimal journey options. The number of pareto-optimal journey options or itineraries presented to the user or passenger may be controlled by adjusting the epsilon resolution value. As shown in FIG. 5B, the number of optimal journey options decreases as the epsilon resolution increases.

One feature of a multi-modal system is to provide more options to users depending on their own preferences. For example, if it determined that five optimal journey options are to be provided to a passenger for selection, an epsilon resolution value of 0.1 may be set. In FIG. 5B, for the graph corresponding to epsilon resolution of 0.1, the five pareto-optimal journey options represented by the open circles are respectively labelled 1" to "5" for easy reference. For a user or passenger that is extremely budget conscious, the user may choose journey option "5", while another user that is extremely time-conscious may choose journey option "1". Further, there are three other journey options in between, i.e., "2", "3" and "4", for passengers to choose from, to suit their own respective budget and/or duration requirement.

Non-limiting exemplary apparatus and methods will now be described.

Figure 6:
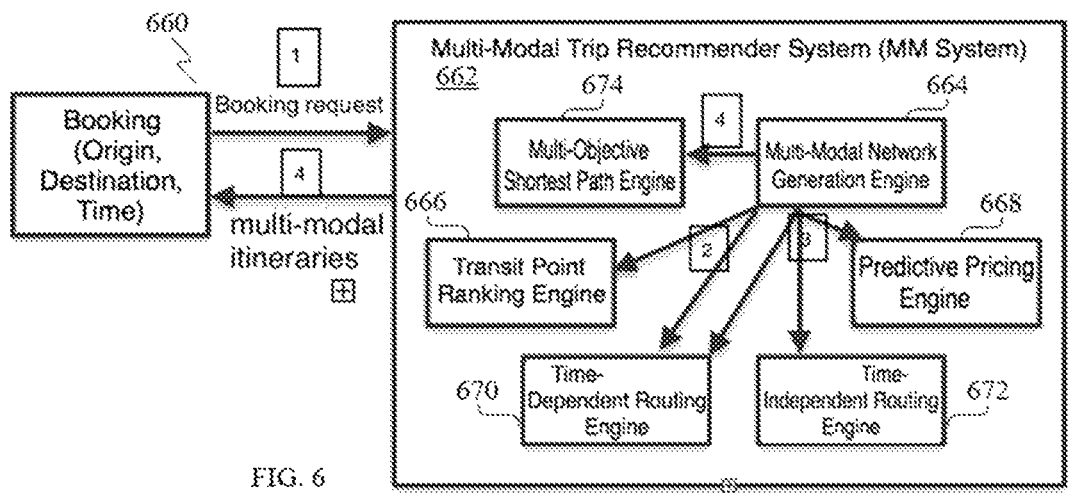
FIG. 6 shows a block diagram of a multi-modal trip recommender system.

FIG. 6 shows a block diagram of a multi-modal (MM) trip recommender system 662. The recommender system 662 may be part of a communications server apparatus. The MM system 662 may include one or more modules or engines, including but not limited to, a Multi-Modal Network Generation Engine 664, a Transit Point Ranking Engine 666, a Predictive Pricing Engine 668, a Time-Dependent Routing Engine 670, a Time-Independent Routing Engine 672 and a Multi-Objective Shortest Path Engine 674. There may be communication between the Multi-Modal Network Generation Engine 664, and each of the Transit Point Ranking Engine 666, Predictive Pricing Engine 668, Time-Dependent Routing Engine 670, Time-Independent Routing Engine 672 and Multi-Objective Shortest Path Engine 674. The numbers "1" to "4" shown in FIG. 6 correspond to the respective steps described below.

1. A passenger creates a booking request 660 which specifies a pick-up point (Origin; O), a drop-off point (Destination; D), and a time of departure (T). Accordingly, there may be user request data including a data field indicative of the origin location (O) and a data field indicative of the destination location (D). The user request data may further include a data field indicative of the time of departure (T).
2. The MM system 662 receives the request 660, and the Multi-Modal Network Generation Engine 664 initiates its process by invoking the Transit Point Ranking Engine 666 to retrieve the nodes (e.g., transit points) of the multi-modal network (see, for example, FIG. 4). The Transit Point Ranking Engine 666 is invoked to obtain a list of time-independent transit points with low surge values. The Time-Dependent Routing Engine 670 may also be invoked to obtain a list of time-dependent transit points.
3. The Multi-Modal Network Generation Engine 664 invokes the Predictive Pricing Engine 668, the Time-Dependent Routing Engine 670, and the Time-Independent Routing Engine 672 to populate the links (see, for example, the edges shown in FIG. 4) and parameterise them with the criteria of interest (e.g., duration of the trip section or leg, fare of trip section, number of transfer(s), for defining part of transit data). At step (2), the Time- Dependent Routing Engine 670 may only return the list of time-dependent transit points. At step (3), the Time-Dependent Routing Engine 670 may also return the links among the transit points and their respective parameters (duration, fare, and number of transfer).

4. The Multi-Modal Network Generation Engine 664 passes the generated multi-modal network to the Multi-Objective Shortest Path Engine 674 to identify the pareto-optimal multi-modal journey options or itineraries, which in turn is passed to the passenger.

Figure 7A:
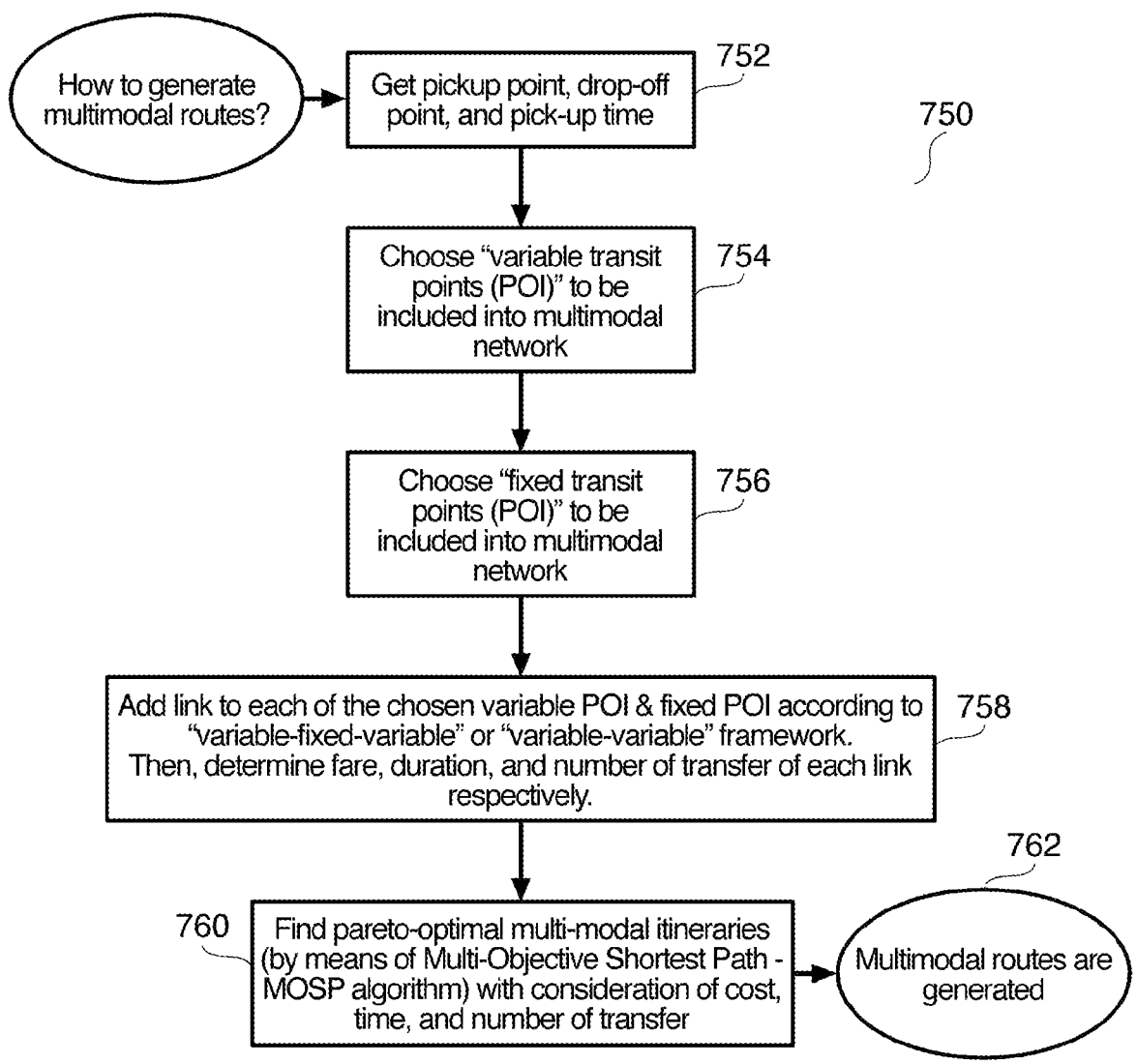
FIG. 7A shows a flowchart illustrating a method for generating multi-modal journey options.

FIG. 7A shows a flowchart 750 illustrating a method for generating multi-modal journey options (or routes).

At 752, the pick-up point (O), the drop-off point (D), and the pick-up time (T) are obtained based on user request.

At 754, for the journey from O to D, variable transit points are determined or chosen to be included into a multi-modal network. Data corresponding to the variable transit points may be provided in respective variable transit point data fields.

At 756, for the journey from O to D, fixed transit points are determined or chosen to be included into the multi-modal network. Data corresponding to the fixed transit points may be provided in respective fixed transit point data fields.

At 758, one or more links are added to each of the determined variable transit point and fixed transit point based on a defined framework, including but not limited to "variable-fixed-variable" or "variable-variable". The fare (or cost), duration and the number of transfer may be determined for each link to define the transit data.

At 760, pareto-optimal multi-modal trip sections or itineraries may be determined (e.g., by means of Multi-Objective Shortest Path (MOSP) algorithm) with consideration of cost, time and number of transfer. This may mean that (all) the possible links added at 758 may be evaluated based on pareto optimality of cost, time, and number of transfer. More detail will be described further below with reference to FIGS. 8A and 8B.

At 762, multi-modal journey options (or routes) are generated.

Figure 7B:
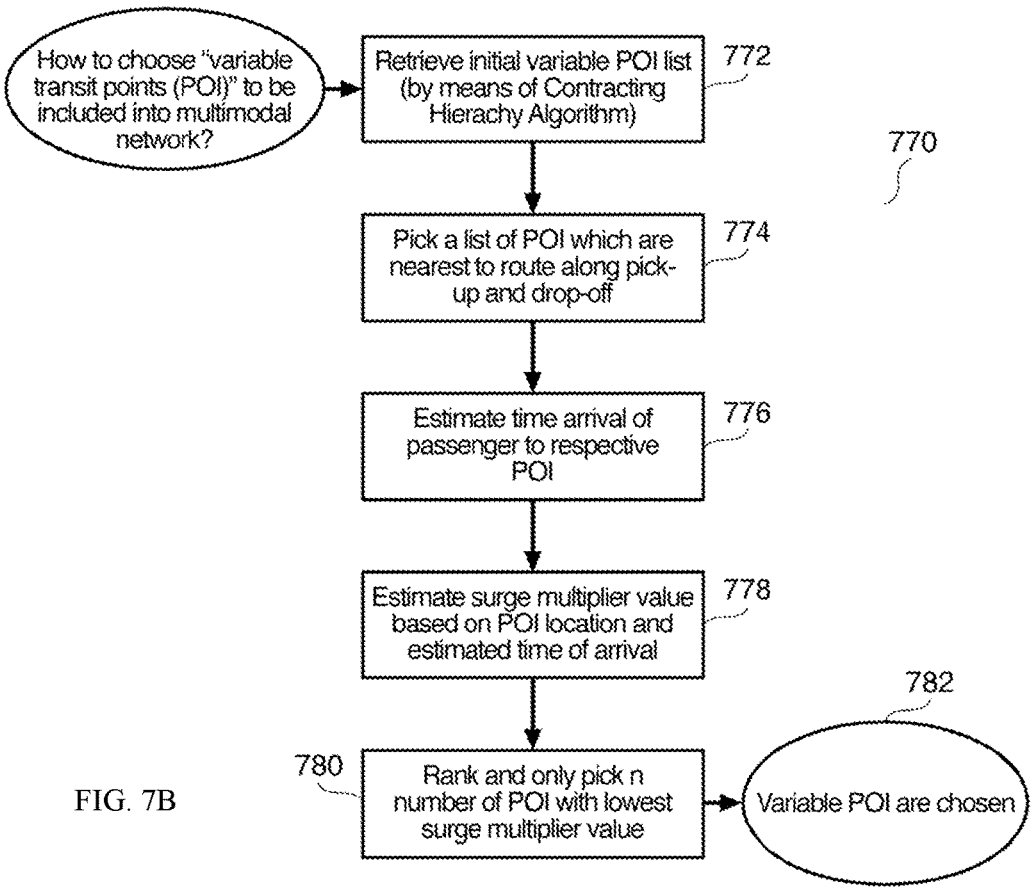
FIG. 7B shows a flowchart illustrating a method for determining variable transit points.

FIG. 7B shows a flowchart 770 illustrating a method for determining variable transit points (or Points of Interest, POI).

At 772, an initial list of variable transit points is retrieved (e.g., by means of Contraction Hierarchy Algorithm).

At 774, from the initial list, a further list is picked, with variable transit points which are nearest to the journey or route from O to D.

At 776, the time of arrival to the respective variable transit points may be estimated.

At 778, a surge multiplier value may be estimated based on the location of the respective variable transit point and the estimated time of arrival.

At 780, the variable transit points may be ranked and a defined number, n, of variable transit points with the lowest surge multiplier value(s) may be selected.

At 782, the required variable transit points are chosen for the multi-modal network.

Figure 7C:
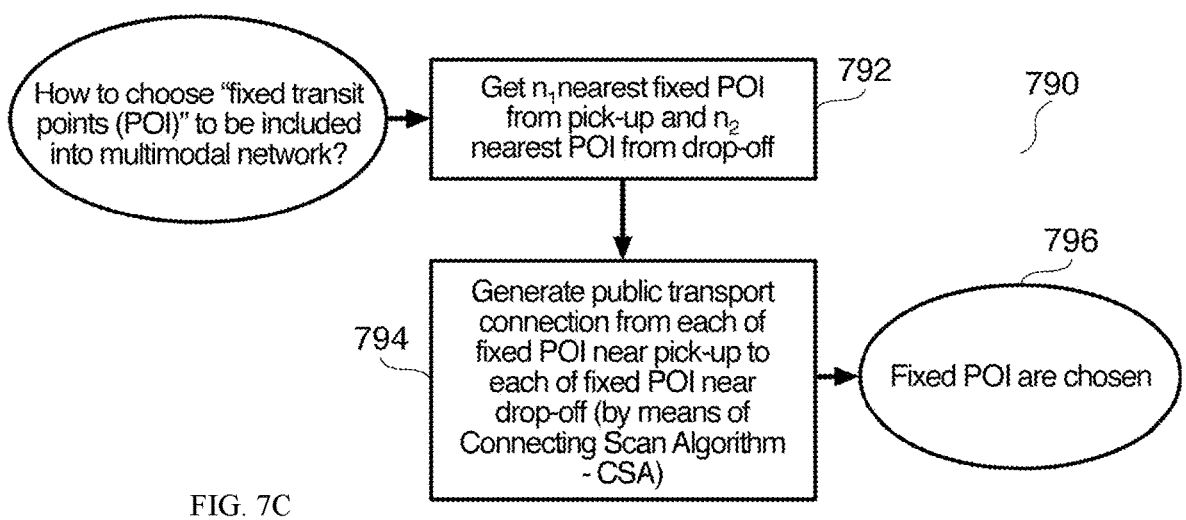
FIG. 7C shows a flowchart illustrating a method for determining fixed transit points.

FIG. 7C shows a flowchart 790 illustrating a method for determining fixed transit points (or Points of Interest, POI).

At 792, a defined number, $n_1$, of the nearest fixed transit points from O, and a defined number, $n_2$, of the nearest fixed transit points from D may be determined or obtained.

At 794, public transport or schedule-based service is generated from each of fixed transit points near O to each of fixed transit points near D (e.g., by means of Connecting Scan Algorithm (CSA)).

At 796, the required variable transit points are chosen for the multi-modal network.

Figure 8A:
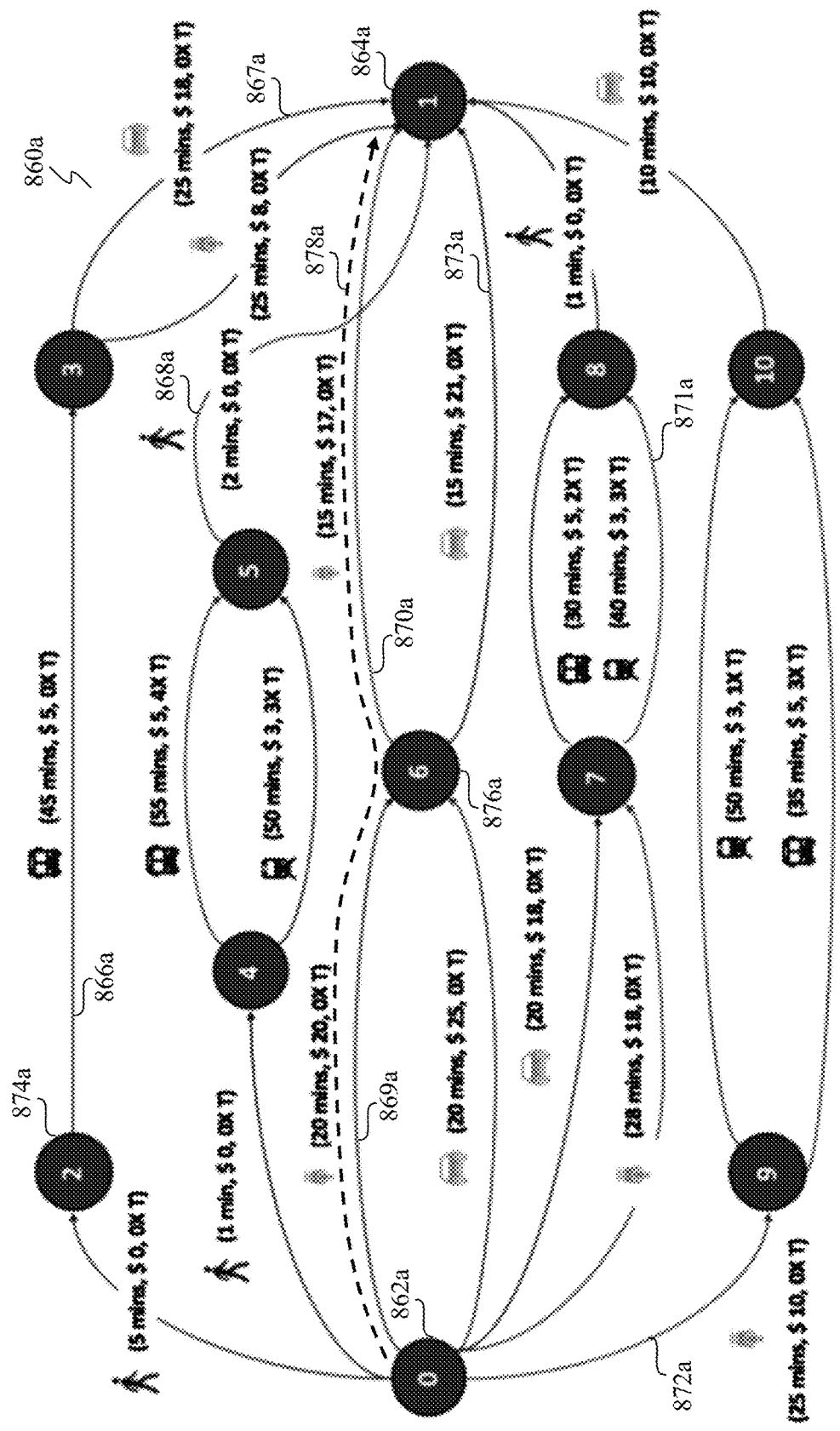
FIG. 8A shows an example of a multi-modal network as input for determination of pareto-optimal multi-modal journey options.

Pareto-optimal multi-modal trip sections or itineraries may be generated based on Multi-Objective Shortest Path algorithm as follows:

FIG. 8A shows an example of a multi-modal network 860a as input for determination of pareto-optimal multi-modal journey options from an origin (O) represented by node "0" 862a to a destination (D) represented by node "1" 864a. As a non-limiting example, the multi-modal network 860a includes a plurality of trip sections (links), e.g., 866a, 867a, 868a, 869a, 870a, 871a, 872a, 873a, and a plurality of transit points (represented by nodes "2" to "10") including fixed transit points, e.g., node "2" 874a, and variable transit points, e.g., node "7" 876a. The multi-modal network 860a provides a plurality of journey options from the origin 862a to the destination 864a, e.g., a journey option is shown as traced by the dashed arrow 878a, via the transit point 876a and the trip sections 869a, 870a.

The multi-modal network 860a, which may be "G (V, E, W)", includes vertices (V) (or nodes), edges (E) (or links), and respective weightage/objective functions (W). The objective functions in consideration may include duration (illustrated in minutes), fare ($), and number of transfers (X T) that define the transit data for the corresponding transportation mode.

Figure 8B:
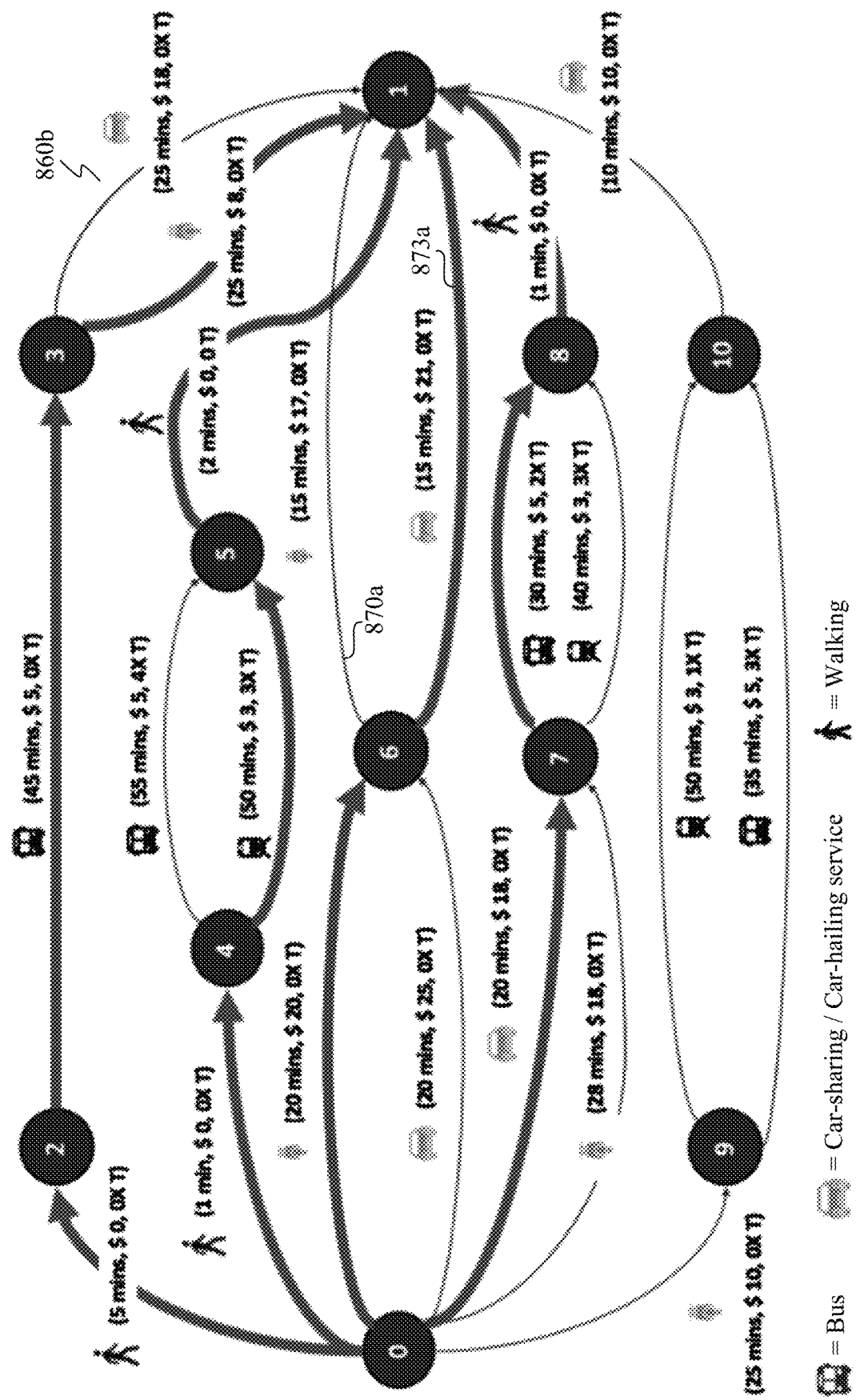
FIG. 8B shows an example of a multi-modal network with pareto-optimal multi-modal journey options as output using the multi-modal network of FIG. 8A as input.

FIG. 8B shows an example of a multi-modal network 860b with pareto-optimal multi-modal journey options as output using the multi-modal network 860a (FIG. 8A) as input. In FIG. 8B, the narrower lines represent non-pareto optimal trip sections, for example, trip section 870a, while the thicker lines represent pareto-optimal trip sections, for example, trip section 873a.

The multi-modal network 860b illustrates a list of pareto-optimal routes. A route is pareto-optimal if no other routes are better in all three objective functions mentioned above.

The procedure involved may include the following:
$u_i$←an initial state of u (a state refers to the array of value of the three objective functions in consideration).
Add $u_i$ to the set of non-dominated set of U (a route is pareto-optimal/non-dominated if no other routes are better in all three objective functions.).
Put the initial state in a priority queue PQ.
While PQ is not empty:
p←pop the state with the highest priority (priority is ordered lexicographically on their objective functions).
iterate over the neighbour nodes of p's node and generate their states.
if the generated state I of neighbour node r is pareto-optimal to r's present non-dominated set of states:
Add I to r's non-dominated set of states.
Add I to PQ.
Return u's non-dominated set of states.

FIG. 9 shows exemplary data structures that may be employed in various embodiments, and their corresponding purposes.

Various embodiments may provide improvements over known systems and methods.

1. Limited Types of Multi-Modal Trips

Known systems offer trips of the form "variable+fixed", "fixed+variable", while various embodiments, in addition, are able to provide trips of the form "variable+variable", "variable+fixed+variable", etc. This means that known systems have only one type of transit points viz. fixed transit points, while various embodiments may consider another type of transit point viz. variable transit points.

The effect of these additional routing forms will become apparent when dynamic fare/availability come into consideration (related to the subsequent points of 'Surging risk" and "Allocation risk" described further below).

A variable transit point may link up two variable trip sections or legs. Fixed transit points generally correspond to transit points where fixed or schedule based transportation modes are provided, for example, train stations, bus stops, or ferry terminals, etc. On the other hand, variable transit points are not constrained by the presence of fixed services. Further, it is preferable that variable transit points are accessible, suitable for picking up or dropping off passengers. It is also desirable that variable transit points incur minimal detour. While accessibility may be assessed and validated with historical bookings, it may not be straightforward to examine the issue of minimal detour with the same. In this regard, the notion of importance may be employed in speeding up shortest distance/time on road network queries.

For efficient routing on the road network, the Contraction Hierarchies (CH) algorithm may be employed, which maintains a ranking of the road network compressed street segments. A high importance indicates that the corresponding street segment is part of many shortest paths relative to the number of street segments it connects to. In other words, a trip's route is more likely to be passing through some of such street segments than the rest of the network. This notion captures both accessibility and minimum detour criterion.

Referring to FIG. 10A, node u 1060 may be considered less important than node v 1062 and node w 1064. Therefore, the node u 1060 may be contracted with a shortcut 1066 linking the important nodes v 1062 and w 1064. Each of the numbers "3", "4", and "7" represents edge weight, which corresponds to distance/duration from one point to the other. During Contraction Hierarchy, the original weights are maintained by summing up at its contracted version.

As an illustrative non-limiting example, FIG. 10B shows the top 100 nodes (potential variable transit points) determined for part of Jakarta, Indonesia. The nodes are marked by closed circles in FIG. 10B, where the markers are 100 representative POI (points of interest) of important streets in Jakarta. In other words, according to CH, a variable transit node is potentially adequate along the corresponding street.

2. Surging Risk

As subsequent legs of a multi-modal trip may take place in the future, the corresponding fares may need to be forecasted if the fares are to be estimated appropriately or correctly. Known systems do not address this issue. Various embodiments attempt to handle this risk based on historical data as follows:

(a) Predictive ranking of transit points: a machine learning model is built to rank—in real-time—the transit points along the route from O to D in terms of supply, surge, etc. This may be thought of as a first stage in discarding transit points that have too high a surge risk for consideration.

(b) Predictive pricing of trip sections or legs: Having filtered out the high-risk transit points, the fare of one or more subsequent trip sections that may be surge-prone may be estimated.

3. Allocation Risk

As subsequent legs of a multi-modal trip may take place in the future, the corresponding (driver) supply condition may need to be forecasted. Similar to surging risk, known systems do not address this issue. However, various embodiments may be able to handle this risk similar to the approach for surging risk. The risk may be handled based on the predictive model of transit points (POI) and the estimated price/supply condition.

4. Efficient Networks Maintenance and Query

Various embodiments maintain the different types of network—road network covered by variable transport modes/services, and transit network covered by fixed transport modes/services—separately for generating the multi-modal network. Such an approach may enable one or more of the following:

Ability to use respective or specialised routing algorithms for each network, e.g., Contraction Hierarchy (CH) for time-independent; Connection Scan Algorithm (CSA) for time-dependent.

Ease of injecting real-time updates on time-dependent networks. As time-dependent network is maintained separately, it is simpler to consume a stream of real-time updates to amend the time-dependent network on the fly. Examples of such updates may include train delay/disruption which may affect the recommended routes or trip sections. While updates may be provided to the time-independent network, these may not have any effect on the recommended routes or trip sections. Such updates may be for the purpose of tracking the real-time location of the transport/vehicle for a ride-hailing transportation service so that a user or passenger may know its whereabouts.

Ease of scalability and maintenance.

By building an efficient and modular network between the time-dependent (transit) network and the time-independent (road) network, one or more dynamic variable transit points may be determined or created through injection of real-time updates on the time-dependent network. As a non-limiting example, during a train breakdown, demand for ride-hailing services in the surrounding area may increase, which may subsequently increase the surge value in the area. In this case, the transit point ranking engine may less likely choose variable transit points. As described herein, variable transit points may be determined real-time based on one or more of the following: connectivity and less detour (CH Algorithm), availability of driver supply (allocation risk), and pricing competitiveness (surging risk).

Further, by having the described real-time capability in various embodiments, a user need not necessarily make an advanced booking for the entire multi-modal journey or trip. In this regard, the status of the trip may be tracked in various embodiments and the user may be prompted near or towards the end of the trip section that the user is in to alert the user to make a booking for the next trip section.

As described above, there is provided apparatus, method and system for recommending multi-modal journeys or trips by generating multi-modal journey options for a user/passenger trying to get from origin (O) to destination (D) ("O→D"). Competitive (or optimal) multi-modal journey options may also be identified. A multi-modal trip may include two or more trip sections constituting the journey for O→D, where the journey may be served by different transportation means in different trip sections, of the types/modes such as on-demand/variable (or time-independent) services (e.g., taxis, ride-sharing, ride-hailing, bike-sharing platforms/schemes), and schedule-based/fixed (or timetable or time-dependent) services (e.g., MRT, metro, trains, buses, ferries). For example, the journey may include a combination of on-demand services, or of fixed services, or of on-demand service(s) and fixed service(s).

Two networks—a road network and a transit network—are maintained separately, from which a multi-modal network may be derived using information of both the road network and the transit network. The "road network" refers to the system of interconnected nodes (i.e., roads/intersections) ("Variable Transit Points"), where the road network in the multi-modal system is covered by on-demand/variable transport services. The "transit network" refers to the system of interconnected nodes (i.e., designated stops) ("Fixed Transit Points"), where the transit network in the multi-modal system is covered by fixed/schedule-based services. By keeping the road network and the transit network separate, the most suitable routing algorithm may be applied to each different network, such as Contraction Hierarchy routing, or Connection Scan Algorithm. Further, real-time updates may be provided separately to either network.

The multi-modal network may provide various journey options with different transit points, including "Variable Transit Points" denoting the start (or end) of variable/on-demand trip sections, and "Fixed Transit Points" denoting the start (or end) of fixed/schedule-based services. The transit points may be chosen to minimise detour in the multi-modal journey over a single-mode O→D journey, and minimise discrepancy between forecasted and actual fare, etc. Transit points having better amount of supply (i.e., driver) may also be recommended by the multi-modal network to the user for subsequent on-demand/variable legs so as to maximise allocation.

Based on the derived multi-modal network, optimal multi-modal journeys for O→D may be identified in accordance with user preference(s). The optimal multi-modal journey options may be identified using "Pareto efficiency" to provide a number of pareto-optimal journey options to the user for selection. This helps to ensure that a user who chooses a journey option based on his/her preference on one parameter (e.g., cost) will not suffer too much (in the best possible way) in terms of other parameter(s) (e.g., time and/or convenience). The notion of "epsilon-dominance" may be used for the optimisation to limit/control the number of optimal multi-modal journey options to be recommended or made available to the user.

The system may also determine, based on historical data, transit points in the multi-modal network that may have high risks of surge pricing and remove such transit points from any recommended multi-modal journey options.

It should be appreciated that various embodiments may be employed to cover more applications, and may be extended to include other modes of transportation including but not limited to bicycle, ferry, and mini-vans. Various embodiments may also be employed in supply and demand shaping, and, potentially enable consistent pricing for the services.

There are also provided a computer program product having instructions for implementing the method for managing a request for transport-related services as described herein, a computer program having instructions for implementing the method for managing a request for transport-related services, and a non-transitory storage medium storing instructions, which, when executed by a processor, cause the processor to perform the method for managing a request for transport-related services.

It will be appreciated that the invention has been described by way of example only. Various modifications may be made to the techniques described herein without departing from the spirit and scope of the appended claims. The disclosed techniques include techniques which may be provided in a stand-alone manner, or in combination with one another. Therefore, features described with respect to one technique may also be presented in combination with another technique.

The invention claimed is:

1. A communications server apparatus for managing a request for transport-related services, comprising a processor and a memory, the communications server apparatus being configured, under control of the processor to execute instructions stored in the memory to:
   in response to receiving user request data comprising a data field indicative of an origin location and a data field indicative of a destination location,
      generate a data record comprising a plurality of transit point data fields having data for a corresponding plurality of transit points from the origin location to the destination location, the plurality of transit point data fields comprising a variable transit point data field having data corresponding to a variable transit point, wherein a location of the variable transit point is changeable and is determined based on data associated with at least one transportation network-related parameter;
      generate, in the data record, a plurality of trip section data fields for a corresponding plurality of trip sections defining navigation directions from the origin location to the destination location; and
   wherein, for each trip section data field, the communications server apparatus is further configured to associate the trip section data field with a respective transit point data field of the plurality of transit point data fields, and further configured to, based on the data of the associated transit point data field, determine a respective transportation mode for the corresponding trip section and generate transit data in respect of the respective transportation mode,
   wherein the respective transportation mode for the trip section data field associated with the variable transit point data field comprises a ride-hailing transportation mode,
   wherein the data associated with the at least one transportation network-related parameter correspond to a fare surge-related parameter,
   wherein the plurality of trip section data fields and the plurality of transit point data fields are generated to define a plurality of journey options from the origin location to the destination location,
   wherein each journey option of the plurality of journey options is defined by at least two trip section data fields of the plurality of trip section data fields, and
   wherein the at least two trip section data fields are for corresponding trip sections defining the navigation directions for a single journey starting from the origin location and ending at the destination location.

2. The communications server apparatus as claimed in claim 1, wherein the plurality of journey options comprise at least one multi-modal journey option.

3. The communications server apparatus as claimed in claim 1, wherein the communications server apparatus is further configured to identify, from the plurality of journey options, and based on the transit data corresponding to the at least two trip section data fields defining the each journey option, one or more pareto-optimal journey options.

4. The communications server apparatus as claimed in claim 3, wherein the communications server apparatus is further configured to, based on a defined epsilon resolution value, control the number of pareto-optimal journey options to be identified.

5. The communications server apparatus as claimed in claim 1, wherein the data associated with the at least one transportation network-related parameter further correspond to at least one of:
a supply of drivers,
accessibility to the user, or
a detour-related parameter.

6. The communications server apparatus as claimed in claim 5,
wherein the data associated with the at least one transportation network-related parameter correspond to the fare surge-related parameter, and
wherein the communications server apparatus is further configured to:
generate, in the data record, a plurality of initial variable transit point data fields for a corresponding plurality of initial variable transit points from the origin location to the destination location;
determine, for each initial variable transit point data field of the plurality of initial variable transit point data fields, a value for the fare surge-related parameter, and
if an initial variable transit point data field of the plurality of initial variable transit point data fields has the value above a threshold value indicative of high risk of fare surging, disregard the initial variable transit point corresponding to the initial variable transit point data field, and
if an initial variable transit point data field of the plurality of initial variable transit point data fields has the value below the threshold value, maintain the initial variable transit point corresponding to the initial variable transit point data field as a candidate for the variable transit point.

7. The communications server apparatus as claimed in claim 5,
wherein the data associated with the at least one transportation network-related parameter correspond to the detour-related parameter, and
wherein the communications server apparatus is further configured to:
generate, in the data record, a plurality of primary variable transit point data fields for a corresponding plurality of primary variable transit points from the origin location to the destination location;
determine, for each primary variable transit point data field of the plurality of primary variable transit point data fields, a value for the detour-related parameter, and
if a primary variable transit point data field of the plurality of primary variable transit point data fields has the value above a threshold value indicative of minimal detour, maintain the primary variable transit point corresponding to the primary variable transit point data field as a candidate for the variable transit point, and
if a primary variable transit point data field of the plurality of primary variable transit point data fields has the value below the threshold value, disregard the primary variable transit point corresponding to the primary variable transit point data field.

8. The communications server apparatus as claimed in claim 1, wherein the communications server apparatus is further configured to:
update, in a trip section data field of the plurality of trip section data fields, a travel progress of the user through the corresponding trip section; and
provide an alert to the user, via the user's communication device, prior to the end of the corresponding trip section.

9. A method, performed in a communications server apparatus for managing a request for transport-related services, the method comprising, under control of a processor of the communications server apparatus:
in response to receiving user request data comprising a data field indicative of an origin location and a data field indicative of a destination location,
generate a data record comprising a plurality of transit point data fields having data for a corresponding plurality of transit points from the origin location to the destination location, the plurality of transit point data fields comprising a variable transit point data field having data corresponding to a variable transit point, wherein a location of the variable transit point is changeable and is determined based on data associated with at least one transportation network-related parameter;
generate, in the data record, a plurality of trip section data fields for a corresponding plurality of trip sections defining navigation directions from the origin location to the destination location; and
wherein, for each trip section data field, associate the trip section data field with a respective transit point data field of the plurality of transit point data fields, and further, based on the data of the associated transit point data field, determine a respective transportation mode for the corresponding trip section and generate transit data in respect of the respective transportation mode,
wherein the respective transportation mode for the trip section data field associated with the variable transit point data field comprises a ride-hailing transportation mode,
wherein the data associated with the at least one transportation network-related parameter correspond to a fare surge-related parameter,
wherein the plurality of trip section data fields and the plurality of transit point data fields are generated to define a plurality of journey options from the origin location to the destination location,
wherein each journey option of the plurality of journey options is defined by at least two trip section data fields of the plurality of trip section data fields, and
wherein the at least two trip section data fields are for corresponding trip sections defining the navigation directions for a single journey starting from the origin location and ending at the destination location.

10. The method as claimed in claim 9, wherein the plurality of journey options comprise at least one multimodal journey option.

11. The method as claimed in claim 9, further comprising identifying, from the plurality of journey options, and based on the transit data corresponding to the at least two trip section data fields defining the each journey option, one or more pareto-optimal journey options.

12. The method as claimed in claim 11, further comprising controlling, based on a defined epsilon resolution value, the number of pareto-optimal journey options to be identified.

13. The method as claimed in claim 9, wherein the data associated with the at least one transportation network-related parameter further correspond to at least one of:
a supply of drivers,
accessibility to the user, or
a detour-related parameter.

14. The method as claimed in claim 13,
wherein the data associated with the at least one transportation network-related parameter correspond to the fare surge-related parameter, and
the method further comprises:
generating, in the data record, a plurality of initial variable transit point data fields for a corresponding plurality of initial variable transit points from the origin location to the destination location;
determining, for each initial variable transit point data field of the plurality of initial variable transit point data fields, a value for the fare surge-related parameter, and
if an initial variable transit point data field of the plurality of initial variable transit point data fields has the value above a threshold value indicative of high risk of fare surging, disregarding the initial variable transit point corresponding to the initial variable transit point data field, and
if an initial variable transit point data field of the plurality of initial variable transit point data fields has the value below the threshold value, maintaining the initial variable transit point corresponding to the initial variable transit point data field as a candidate for the variable transit point.

15. The method as claimed in claim 13,
wherein the data associated with the at least one transportation network-related parameter correspond to the detour-related parameter, and
the method further comprises:
generating, in the data record, a plurality of primary variable transit point data fields for a corresponding plurality of primary variable transit points from the origin location to the destination location;
determining, for each primary variable transit point data field of the plurality of primary variable transit point data fields, a value for the detour-related parameter, and
if a primary variable transit point data field of the plurality of primary variable transit point data fields has the value above a threshold value indicative of minimal detour, maintaining the primary variable transit point corresponding to the primary variable transit point data field as a candidate for the variable transit point, and
if a primary variable transit point data field of the plurality of primary variable transit point data fields has the value below the threshold value, disregarding the primary variable transit point corresponding to the primary variable transit point data field.

16. The method as claimed in claim 9, further comprising:
updating, in a trip section data field of the plurality of trip section data fields, a travel progress of the user through the corresponding trip section; and
providing an alert to the user, via the user's communication device, prior to the end of the corresponding trip section.

17. A non-transitory storage medium storing instructions, which, when executed by a processor, cause the processor to:
in response to receiving user request data comprising a data field indicative of an origin location and a data field indicative of a destination location,
generate a data record comprising a plurality of transit point data fields having data for a corresponding plurality of transit points from the origin location to the destination location, the plurality of transit point data fields comprising a variable transit point data field having data corresponding to a variable transit point, wherein a location of the variable transit point is changeable and is determined based on data associated with at least one transportation network-related parameter;
generate, in the data record, a plurality of trip section data fields for a corresponding plurality of trip sections defining navigation directions from the origin location to the destination location; and
wherein, for each trip section data field, associate the trip section data field with a respective transit point data field of the plurality of transit point data fields, and further, based on the data of the associated transit point data field, determine a respective transportation mode for the corresponding trip section and generate transit data in respect of the respective transportation mode,
wherein the respective transportation mode for the trip section data field associated with the variable transit point data field comprises a ride-hailing transportation mode,
wherein the data associated with the at least one transportation network-related parameter correspond to a fare surge-related parameter,
wherein the plurality of trip section data fields and the plurality of transit point data fields are generated to define a plurality of journey options from the origin location to the destination location,
wherein each journey option of the plurality of journey options is defined by at least two trip section data fields of the plurality of trip section data fields, and
wherein the at least two trip section data fields are for corresponding trip sections defining the navigation directions for a single journey starting from the origin location and ending at the destination location.

18. A communications system for managing a request for transport-related services, comprising a communications server apparatus, at least one user communications device and communications network equipment operable for the communications server apparatus and the at least one user communications device to establish communication with each other therethrough,
wherein the at least one user communications device comprises a first processor and a first memory, the at least one user communications device being configured, under control of the first processor, to execute first instructions stored in the first memory to:
in response to receiving first request data comprising a data field indicative of an origin location and a data field indicative of a destination location,
generate data corresponding to the origin location and the destination location; and
transmit the data for receipt by the communications server apparatus for processing; and
wherein the communications server apparatus comprises a second processor and a second memory, the communications server apparatus being configured, under control of the second processor, to execute second instructions stored in the second memory to:
in response to receiving second request data indicative of the data transmitted by the at least one user communications device,
generate a data record comprising a plurality of transit point data fields having data for a corresponding plurality of transit points from the origin location to the destination location, the plurality of transit point data fields comprising a variable transit point data field having data corresponding to a variable transit point, wherein a location of the variable transit point is changeable and is determined based on data associated with at least one transportation network-related parameter;

generate, in the data record, a plurality of trip section data fields for a corresponding plurality of trip sections defining navigation directions from the origin location to the destination location;

wherein, for each trip section data field, the communications server apparatus is further configured to associate the trip section data field with a respective transit point data field of the plurality of transit point data fields, and further configured to, based on the data of the associated transit point data field, determine a respective transportation mode for the corresponding trip section and generate transit data in respect of the respective transportation mode, wherein the respective transportation mode for the trip section data field associated with the variable transit point data field comprises a ride-hailing transportation mode, wherein the data associated with the at least one transportation network-related parameter correspond to a fare surge-related parameter, wherein the plurality of trip section data fields and the plurality of transit point data fields are generated to define a plurality of journey options from the origin location to the destination location, wherein each journey option of the plurality of journey options is defined by at least two trip section data fields of the plurality of trip section data fields, and wherein the at least two trip section data fields are for corresponding trip sections defining the navigation directions for a single journey starting from the origin location and ending at the destination location; and transmit, for receipt by the at least one user communications device, data corresponding to the plurality of trip sections, and, for each trip section of the plurality of trip sections, data corresponding to a respective transit point associated with the trip section, data corresponding to a respective transportation mode for the trip section and the transit data in respect of the respective transportation mode.

* * * * *